(12) United States Patent
Nagashima et al.

(10) Patent No.: US 6,676,734 B2
(45) Date of Patent: Jan. 13, 2004

(54) INK, INK-JET RECORDING PROCESS, RECORDED ARTICLE, RECORDING UNIT, INK CARTRIDGE, INK-JET RECORDING APPARATUS, FLUORESCENCE ENHANCING METHOD AND METHOD OF ELONGATING LIFE TIME OF FLUORESCENCE

(75) Inventors: Akira Nagashima, Tokyo (JP); Shinichi Hakamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 09/923,417

(22) Filed: Aug. 8, 2001

(65) Prior Publication Data

US 2002/0047884 A1 Apr. 25, 2002

(30) Foreign Application Priority Data

| Aug. 8, 2000 | (JP) | ....................... 2000-240314 |
| Aug. 8, 2000 | (JP) | ....................... 2000-240492 |
| Nov. 21, 2000 | (JP) | ....................... 2000-354169 |
| Nov. 21, 2000 | (JP) | ....................... 2000-354185 |
| Jul. 31, 2001 | (JP) | ....................... 2001-232792 |
| Jul. 31, 2001 | (JP) | ....................... 2001-232931 |

(51) Int. Cl.$^7$ ............................................. C09D 11/00
(52) U.S. Cl. ................. 106/31.32; 106/31.58; 106/31.86; 106/31.64; 106/31.59; 106/31.43; 106/31.75; 106/31.89
(58) Field of Search .................. 106/31.32, 31.58, 106/31.86, 31.64, 31.59, 31.43, 31.89, 31.75

(56) References Cited

U.S. PATENT DOCUMENTS

| 4,313,124 A | 1/1982 | Hara ......................... 346/140 |
| 4,345,262 A | 8/1982 | Shirato et al. .............. 346/140 |

(List continued on next page.)

FOREIGN PATENT DOCUMENTS

| EP | 624-470 | 11/1994 |
| EP | 900830 | 3/1999 |
| EP | 921165 | 6/1999 |
| EP | 685537 | 10/1999 |
| JP | 54-056847 | 5/1979 |
| JP | 59-123670 | 7/1984 |
| JP | 59-138461 | 8/1984 |
| JP | 60-071260 | 4/1985 |
| JP | 5-293976 | 11/1993 |
| JP | 6-191143 | 7/1994 |
| JP | 7-9755 | 1/1995 |
| JP | 7-305013 | 11/1995 |
| JP | 8-53639 | 2/1996 |
| JP | 8-151545 | 6/1996 |
| JP | 9-1294 | 1/1997 |
| JP | 9-3375 | 1/1997 |
| JP | 9-132729 | 5/1997 |
| JP | 9-137097 | * 5/1997 |
| JP | 9-137098 | * 5/1997 |
| JP | 9-137099 | * 5/1997 |
| JP | 9-165539 | * 6/1997 |
| JP | 9-241550 | 9/1997 |
| JP | 9-241565 | * 9/1997 |
| JP | 9-255904 | * 9/1997 |
| JP | 9-286939 | * 11/1997 |

(List continued on next page.)

*Primary Examiner*—Mark L. Bell
*Assistant Examiner*—Veronica F. Faison
(74) *Attorney, Agent, or Firm*—Fitzpatrick, Cella, Harper & Scinto

(57) ABSTRACT

Disclosed herein is an ink comprising
(i) first and second organic compounds which are incompatible with each other;
(ii) at least one of a compound exhibiting fluorescence properties and a coloring material exhibiting fluorescence properties; and
(iii) a liquid medium dissolving or dispersing the components (i) and (ii) therein.

5 Claims, 15 Drawing Sheets

U.S. PATENT DOCUMENTS

| | | | |
|---|---|---|---|
| 4,368,047 A | | 1/1983 | Andrade et al. ................ 435/4 |
| 4,459,600 A | | 7/1984 | Sato et al. ................... 346/140 |
| 4,463,359 A | | 7/1984 | Ayata et al. .................. 346/1.1 |
| 4,472,479 A | | 9/1984 | Hayes et al. ................. 428/324 |
| 4,558,333 A | | 12/1985 | Sugitani et al. ............. 346/140 |
| 4,608,577 A | * | 8/1986 | Hori ........................... 346/140 |
| 4,723,129 A | * | 2/1988 | Endo et al. ................... 346/1.1 |
| 4,740,796 A | * | 4/1988 | Endo et al. ................... 346/1.1 |
| 4,799,756 A | | 1/1989 | Hirschfeld ............... 350/96.18 |
| 4,855,200 A | | 8/1989 | Tomita et al. ................. 430/25 |
| 5,084,205 A | | 1/1992 | Auslander .............. 252/301.16 |
| 5,218,376 A | * | 6/1993 | Asai ........................... 346/1.1 |
| 5,279,652 A | | 1/1994 | Kaufmann et al. ........ 106/19 A |
| 5,485,188 A | * | 1/1996 | Tochihara et al. .......... 347/100 |
| 5,560,770 A | | 10/1996 | Yatake ..................... 106/22 R |
| 5,580,374 A | * | 12/1996 | Okumura et al. ............. 524/84 |
| 5,609,673 A | | 3/1997 | Takimoto et al. ........ 106/31.48 |
| 5,614,008 A | | 3/1997 | Escano et al. ............ 106/23 D |
| 5,637,140 A | * | 6/1997 | Fujioka ................... 106/31.35 |
| 5,665,151 A | | 9/1997 | Escano et al. ........... 106/31.15 |
| 5,674,314 A | * | 10/1997 | Auslander et al. ........... 524/104 |
| 5,681,381 A | * | 10/1997 | Auslander et al. ........... 523/161 |
| 5,710,195 A | | 1/1998 | Subbaraman et al. ......... 524/31 |
| 5,743,945 A | | 4/1998 | Yamashita et al. ....... 106/31.58 |
| 5,769,930 A | | 6/1998 | Sano et al. ............... 106/31.36 |
| 5,795,375 A | | 8/1998 | Yamazaki et al. ........ 106/31.57 |
| 5,852,074 A | | 12/1998 | Tsutsumi et al. ............ 523/161 |
| 5,861,056 A | | 1/1999 | Yamazaki et al. ........ 106/31.27 |
| 5,865,883 A | | 2/1999 | Teraoka et al. .......... 106/31.32 |
| 5,871,572 A | | 2/1999 | Marritt .................... 106/31.36 |
| 5,932,139 A | | 8/1999 | Oshima et al. ........ 252/301.16 |
| 5,938,829 A | | 8/1999 | Higashiyama et al. ... 106/31.58 |
| 6,024,785 A | * | 2/2000 | Morimoto ................ 106/31.57 |
| 6,051,057 A | | 4/2000 | Yatake et al. ............. 106/31.58 |
| 6,176,908 B1 | * | 1/2001 | Bauer et al. ............. 106/31.15 |

FOREIGN PATENT DOCUMENTS

| | | | |
|---|---|---|---|
| JP | 10-7962 | * | 1/1998 |
| JP | 2-783647 | | 5/1998 |
| JP | 10-183043 | * | 7/1998 |
| JP | 10-193775 | * | 7/1998 |
| JP | 10-298462 | * | 11/1998 |
| JP | 10-298467 | | 11/1998 |
| JP | 11-80639 | | 3/1999 |
| JP | 11-320921 | | 11/1999 |
| JP | 2-995853 | | 12/1999 |
| JP | 2000-38529 | | 2/2000 |

* cited by examiner

INK, INK-JET RECORDING PROCESS, RECORDED ARTICLE, RECORDING UNIT, INK CARTRIDGE, INK-JET RECORDING APPARATUS, FLUORESCENCE ENHANCING METHOD AND METHOD OF ELONGATING LIFE TIME OF FLUORESCENCE

BACKGROUND OF THE INVENTION

1. Field of the Invention

The present invention relates to an ink, an ink-jet recording process using such an ink, a recorded article obtained by such a recording process and instruments using such an ink, and particularly to an ink which can enhance fluorescence intensity and provide a recorded article good in record quality including stability, reliability and coloring ability to look at, an ink-jet recording process using such an ink, a recorded article obtained by the recording process, and instruments using such an ink. The present invention also relates to a method of enhancing fluorescence of a fluorescent colored portion of a recorded article comprising a recording medium and the colored portion provided thereon, and a method of elongating the life time of fluorescence.

2. Related Background Art

Various investigations and reports have heretofore been made on inks for writing utensils and inks for ink-jet. In particular, in order to enhance the quality of recorded articles, including fluorescence intensity and coloring ability, such various proposals as described above have been made. For example, proposals of coloring materials and the like each having a novel structure, which are suitable for use in inks for the above-described use applications, proposals of inks using a coloring material (hereinafter referred to as "fluorescent coloring material") exhibiting fluorescence properties as a main coloring material, and proposals as to the combined use of a fluorescent coloring material as a coloring material for inks have been made. In particular, the proposals as to inks, which pay attention to the fluorescence properties of fluorescent coloring materials, include Japanese Patent Application Laid-Open Nos. 8-151545, 9-132729, 10-193775, 10-298462 and 10-298467, and Japanese Patent No. 233038, and novel recording processes and fluorescent coloring materials have been proposed therein.

In addition, the proposals as to the use of fluorescent coloring materials include Japanese Patent Application Laid-Open Nos. 5-293976, 6-191143, 6-322307, 7-009755, 7-305013, 8-053639, 9-003375, 9-01294, 9-137097, 9-137098, 9-137099, 9-165539, 9-241565, 9-255904, 9-286939, 10-007962, 10-183043, 11-080639, 11-320921 and 2000-038529, and Japanese Patent No. 2995853.

In recent years, the use applications of fluorescent coloring materials have not been limited to the mere formation of beautiful color images heretofore conducted, and there have been proposed, for example, technical development that fluorescence properties are imparted to an ink, information such as characters, numerals, marks and/or bar codes is recorded on a recording medium with such an ink, and the fluorescent ink is caused to emit light by irradiating the recording medium with ultraviolet light having a proper wavelength, thereby imparting another information (for example, security information) than visible information. Accordingly, there is room to widen the use applications of inks exhibiting fluorescence properties in many fields, and there is a strong demand for development of inks which are stable, reliable, high in fluorescence intensity and excelling in coloring ability.

SUMMARY OF THE INVENTION

With respect to the coloring ability of an ink on a recording medium, however, only chromaticity (L*,a*,b*) that is used as a measure of colors has heretofore been considered. Even when a fluorescent color material is used, design is also made according to the conventional measure under the circumstances. Therefore, it has been hard to say that the fluorescence properties of the coloring material are fully utilized. More specifically, even in the above-described various proposals making use of the fluorescent coloring materials, in the standpoint of the coloring ability of the coloring materials, the fluorescent coloring materials are used on the basis of only the viewpoint of (L*,a*,b*), not the viewpoint of the fluorescence properties, or attention is paid to the fluorescence properties of the coloring materials, but no attention is paid to the color developing properties of fluorescence, in other words, the interfacial properties of the fluorescence. Therefore, such proposals have not fully made the best use of the fluorescence properties of the coloring materials.

It is accordingly an object of the present invention to provide an ink which can provide a recorded article to the recorded portion of which, for example, fluorescence properties important for colors of the natural kingdom are sufficiently imparted fully making good use of the fluorescence properties of the ink, and which the recorded article has high fluorescence intensity and is excellent in print quality including coloring ability, said ink being capable of enhancing the stability and reliability of the recorded article.

Another object of the present invention is to provide an ink-jet recording process by which a recorded article having a fluorescent colored portion having high fluorescence intensity can be formed simply and stably.

A further object of the present invention is to provide a recorded article equipped with a colored portion having high fluorescence intensity.

A still further object of the present invention is to provide a recorded article having a fluorescent colored portion the fluorescence intensity of which is hard to be deteriorated with time.

A yet still further object of the present invention is to provide an ink-jet recording apparatus, an ink cartridge and a recording unit by which a recorded article having a fluorescent colored portion exhibiting excellent fluorescence intensity can be stably provided.

A yet still further object of the present invention is to provide a method of enhancing fluorescence of a fluorescent colored portion of a recorded article comprising a recording medium and the colored portion provided thereon, and a method of elongating the life time of fluorescence.

The above objects can be achieved by the present invention described below.

According to an embodiment of the present invention, there is thus provided an ink comprising (i) first and second organic compounds which are incompatible with each other;
(ii) at least one of a compound exhibiting fluorescence properties and a coloring material exhibiting fluorescence properties; and
(iii) a liquid medium dissolving or dispersing the components (i) and (ii) therein.

The ink may further have a compound having a vapor pressure of not lower than that of diechyleneglycol.

The ink may be used as an ink for ink-jet.

According to another embodiment of the present invention, there is provided an ink-jet recording process, comprising the step of ejecting the ink for ink-jet described above from an orifice in response to recording signals.

According to a further embodiment of the present invention, there is provided a recorded article obtained by the ink-jet recording process described above, wherein the fluorescence intensity of a recorded portion formed on wood-free paper has a proportional relationship to the water content in the wood-free paper.

According to a still further embodiment of the present invention, there is provided a recorded article having a colored portion exhibiting fluorescence properties on a recording medium, wherein the colored portion contains at least one of a compound exhibiting fluorescence properties and a coloring material exhibiting fluorescence properties and has an interface between the outermost surface thereof and the surface of the recording medium, on which incident light on the colored portion from the outside is reflected.

According to a yet still further embodiment of the present invention, there is provided a recording unit comprising an ink container containing the ink for ink-jet described above and a head portion for ejecting the ink.

According to a yet still further embodiment of the present invention, there is provided an ink cartridge comprising an ink container containing the ink for ink-jet described above.

According to a yet still further embodiment of the present invention, there is provided an ink-jet recording apparatus comprising an ink container containing the ink for ink-jet described above and a head portion for ejecting the ink.

According to a yet still further embodiment of the present invention, there is provided a method of enhancing fluorescence of a fluorescent colored portion of a recorded article comprising a recording medium and the colored portion provided thereon, wherein the colored portion is formed by an ink-jet recording process comprising the step of applying an ink to a recording medium by an ink-jet system, and an ink comprising (i) first and second organic compounds which are incompatible with each other;
(ii) at least one of a compound exhibiting fluorescence properties and a coloring material exhibiting fluorescence properties; and
(iii) a liquid medium dissolving or dispersing the components (i) and (ii) therein is used as said ink.

According to a yet still further embodiment of the present invention, there is provided a method of enhancing fluorescence of a fluorescent colored portion of a recorded article comprising a recording medium and the colored portion provided thereon, which comprises providing a reflecting interface for incident light on the colored portion from the outside between the outermost surface of the colored portion and the surface of the recording medium at the colored portion.

According to a yet still further embodiment of the present invention, there is provided a method of elongating the life time of fluorescence of a fluorescent colored portion of a recorded article comprising a recording medium and the colored portion provided thereon, wherein the colored portion is formed by an ink-jet recording process comprising the step of applying an ink to a recording medium by an ink-jet system, and an ink comprising (i) first and second organic compounds which are incompatible with each other;
(ii) a compound having a vapor pressure not lower than that of diethyleneglycol;
(iii) at least one of a compound exhibiting fluorescence properties and a coloring material exhibiting fluorescence properties; and (iv) a liquid medium dissolving or dispersing the components (i), (ii) and (iii) therein is used as said ink.

DESCRIPTION OF THE PREFERRED EMBODIMENTS

Figure 1:
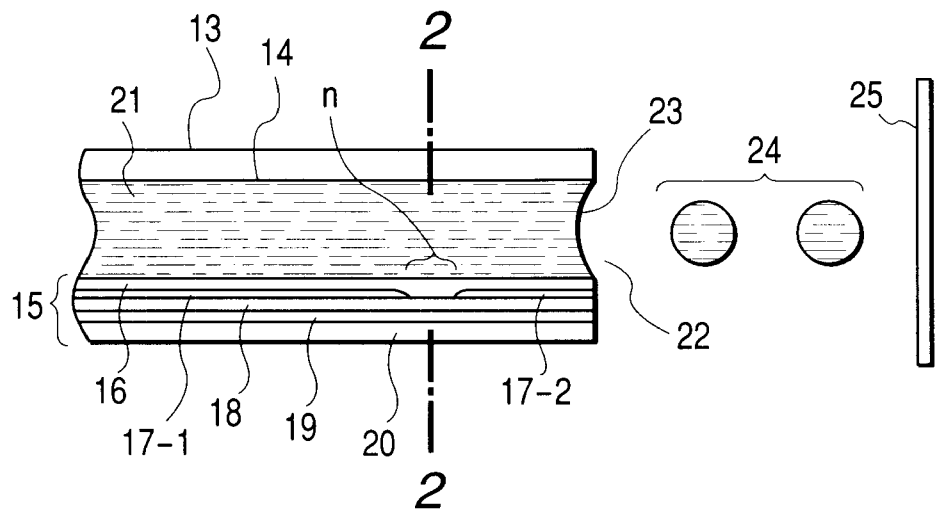
FIG. 1 is a longitudinal cross-sectional view of a head of an ink-jet recording apparatus.

The present invention will hereinafter be described in more detail by the preferred embodiments of the invention.
(First Embodiment)

The ink according to the first embodiment of the present invention has a feature that the ink comprises (i) first and second organic compounds which are incompatible with each other;

(ii) at least one of a compound exhibiting fluorescence properties and a coloring material exhibiting fluorescence properties; and (iii) a liquid medium dissolving or dispersing the components (i) and (ii) therein.

The mechanism that a recorded article good in stability and reliability and moreover good in coloring ability fully making good use of the fluorescence properties of the ink can be provided by the ink according to this embodiment will be first described.

The present inventors have considered a wide variety of mechanisms for developing inks which can provide recorded articles good in stability, reliability and coloring ability and carried out an investigation and identification as to a wide variety of coloring materials and ink compositions. As a result, the inventors have been led to a new fact that when 2 compounds which are incompatible with each other are used as components for an ink, the coloring ability of the resulting recorded article can be made good, thus leading to completion of the present invention.

More specifically, it has been found that when an ink comprising 2 organic compounds which are incompatible with each other, a compound exhibiting fluorescence and/or a coloring material exhibiting fluorescence, and a liquid medium dissolving or dispersing the two organic compounds, and the compound exhibiting fluorescence and/or the coloring material exhibiting fluorescence therein is used, the quality of the resulting recorded article, including fluorescence intensity and coloring ability is improved when the ink is applied on to a recording medium, a recorded article good in stability and reliability is provided, and particularly, such an ink exhibits good results when it is used for ink-jet recording. In addition, it has been found that from the viewpoint of the fluorescence intensity of the recorded article, the ink according to the present invention having the above-described constitution can markedly enhance the fluorescence intensity compared with a recorded article formed with the conventional fluorescent ink.

When a mechanism for an ink which can provide a recorded article good in stability an reliability and moreover good in fluorescence intensity, coloring ability, etc. is considered, attention is generally paid to how to dissolve or disperse a coloring material uniformly and in a good state in the ink as a means for enhancing the fluorescence and coloring ability of the recorded article. In other words, an investigation is made as to how to do away with aggregation of coloring material molecules or dispersed particles in the ink to make the coloring material molecules or dispersed particles small, for example, whether the absorbance of the ink can be enhanced and whether the absorbance can be retained in a high state when consideration is made on the ink, and the ink is designed. It is attempted to make the coloring material molecules or dispersed particles in the ink applied on to a recording medium hard to aggregate by making the design of the ink in such a manner, thereby making the coloring ability and fluorescence properties of the coloring material good.

On the other hand, with respect to recorded articles (prints) formed by applying an ink on to recording media, the present inventors have carried out again an investigation as to the state of the ink on the recording media, and a wide variety of recorded articles in the world, consideration has been conducted repeatedly. As a result, the inventors have first paid attention to the facts that there is an interface between a recording medium and an ink on the recording medium in any recorded article though it may not be sharp, and that the ink on the recording medium is present in a state that the ink has possessed an interface with the atmosphere. Further, attention has been paid to the facts that when recording is conducted on, for example, wood-free paper, the coloring ability of a coloring material to look at tends to be deteriorated when the penetration of the ink is enhanced, and that when recording is conducted on a back coated film, or a recorded article is laminated thereon, the coloring ability of the coloring material to look at is improved. From the facts described above, an investigation has been made from the viewpoints of how to form the interfacial state of the ink to the atmosphere, in which the coloring ability of the coloring material becomes good on the recording medium, after recording, and how to retain such a state, thus leading to completion of the present invention.

The present inventors consider that the ink according to this embodiment can markedly enhance the fluorescence properties and coloring ability of the resulting recorded article by the following specific mechanism.

Figure 7:
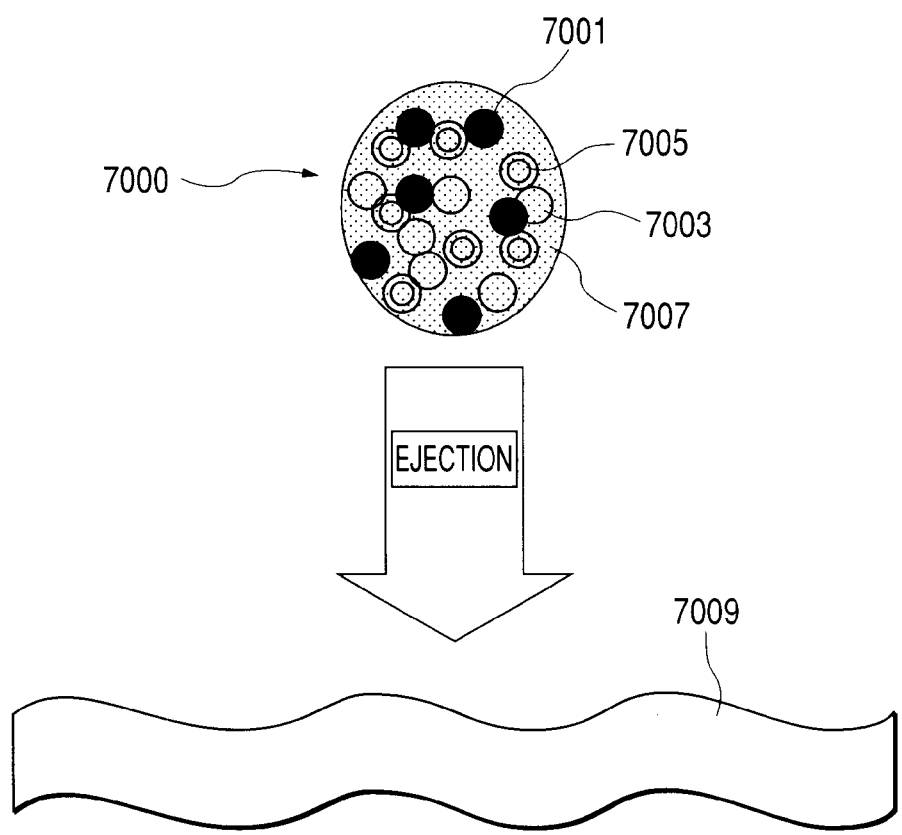
FIG. 7 illustrates the mechanism of coloring including fluorescence intensity according to the present invention.
Figure 8:
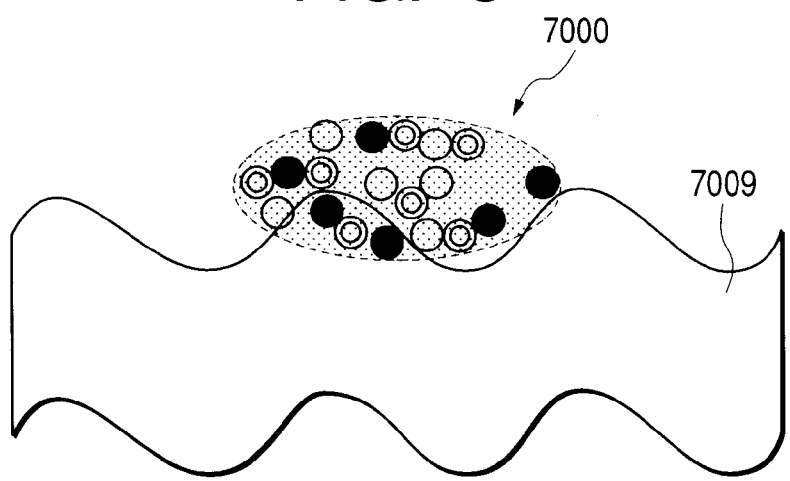
FIG. 8 illustrates the mechanism of coloring including fluorescence intensity according to the present invention.
Figure 9:
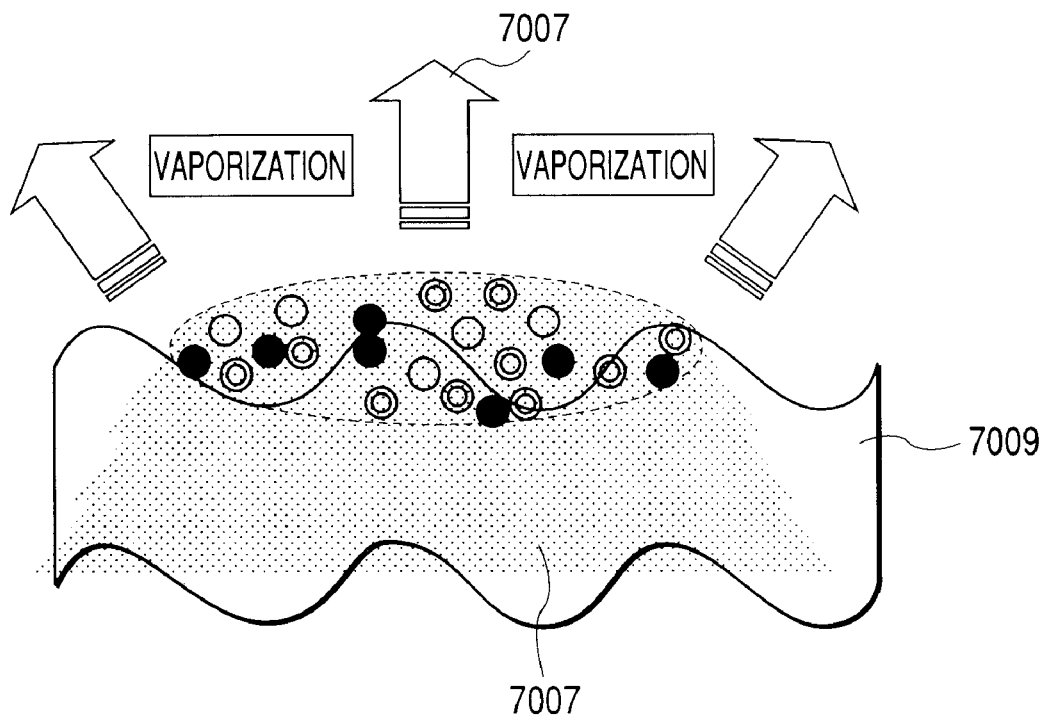
FIG. 9 illustrates the mechanism of coloring including fluorescence intensity according to the present invention.
Figure 10:
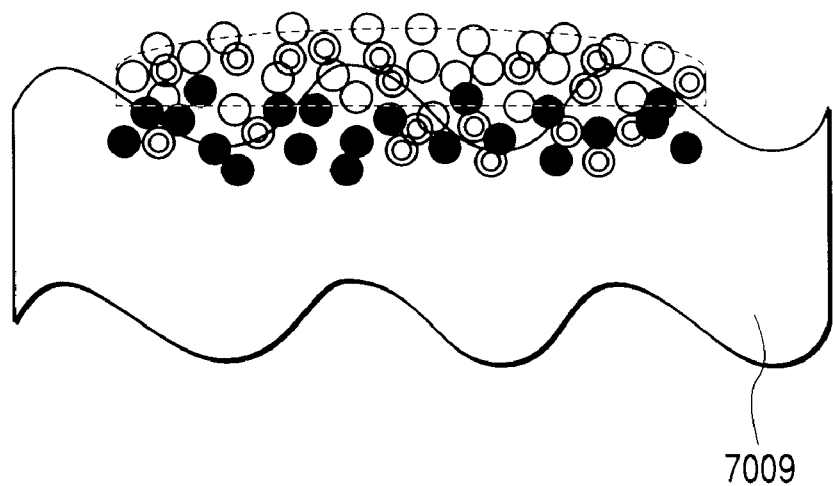
FIG. 10 illustrates the mechanism of coloring including fluorescence intensity according to the present invention.
Figure 11:
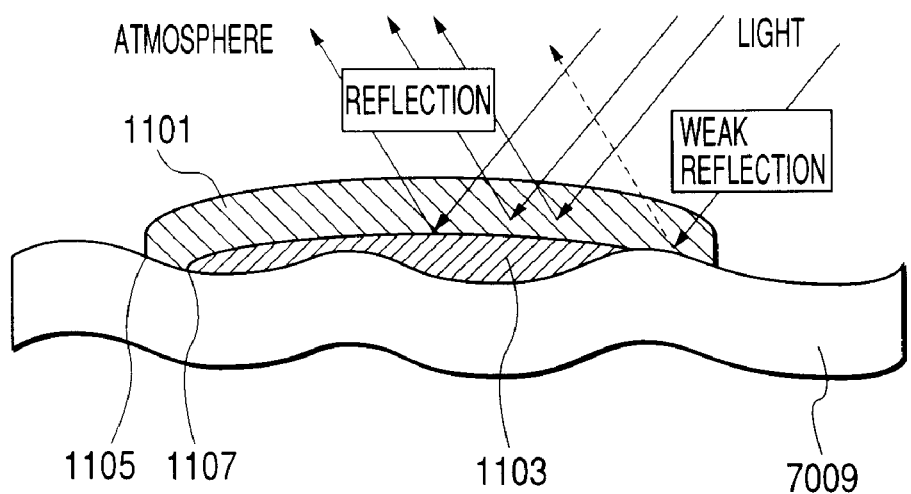
FIG. 11 illustrates the mechanism of coloring including fluorescence intensity according to the present invention.

In the ink according to this embodiment, as illustrated in FIG. 7, the individual components are present in a uniform state that they have been fully dissolved or dispersed in the liquid medium in the state of the ink. In FIG. 7, reference numeral 7000 designates an ink droplet before impacted on a recording medium 7009. In the ink droplet, reference numerals 7001 and 7003 indicate two organic compounds incompatible with each other, 7005 at least one (hereinafter referred to as "coloring material" merely) of a compound exhibiting fluorescence properties and a coloring material exhibiting fluorescence properties, and 7007 a liquid medium dissolving or dispersing the organic compounds 7001, 7003, and the coloring material 7005 therein. Reference numeral 7009 indicates a recording medium. When such an ink droplet 7000 is applied on the recording medium 7009 to conduct recording as illustrated in FIG. 8, a part (particularly, liquid medium 7007) of the ink components evaporates into the atmosphere or penetrates into the recording medium to diffuse, as illustrated in FIG. 9, whereby the constitution and compositional ratio of the ink on the recording medium are changed. As a result, the two organic compounds 7001 and 7003 incompatible with each other, which have been stably present in the state of the ink, undergo phase separation in a lamellar state on the recording medium to form an interface by the ink components between the ink and the atmosphere as illustrated in FIG. 10. Therefore, a state as if a recorded article has been laminated by the individuals of the ink components is created. FIG. 11 typically expresses the state shown in FIG. 10 for simplifying it. A layer indicated by the reference numeral 1101 in FIG. 11 contains the organic compound 7003 and the coloring material 7005, while a layer indicated by the reference numeral 1103 contains the organic compound 7001 and the coloring material 7005. The surface of the layer 1101 forms a gas-liquid interface 1105, and the layers 1101 and 1103 form a liquid—liquid interface 1107 between them. As a result, in the recorded article formed by the ink according to the present invention, the layer 1101 having a stable thickness is formed by the development of the liquid—liquid interface 1107. Therefore, the reflection of light can be effectively developed, and so coloring ability including fluorescence intensity is made good, thereby becoming an effective means for markedly enhancing the fluorescence properties and coloring ability of the recorded article.

According to the investigation by the present inventors, it has been found that when a surfactant is used as one of the two organic compounds incompatible with each other, an image good in coloring ability including fluorescence intensity can be provided. The present inventors consider that this is due to the fact that when the surfactant is used, a micelle layer (1201) of the surfactant is formed as a surface layer covering the layers 1101 and 1103, and the reflection of light can be more effectively developed by this surface layer 1201, so that the coloring ability including fluorescence intensity is made better.

According to a further investigation by the present inventors, it has been found that water is preferably used as the liquid medium in order that the two organic compounds incompatible with each other are caused to coexist in a substantially uniform state in the ink. More specifically, when water is used as the liquid medium, a wider variety of compounds may be used compared with other liquid media, so that not only room for selection of constituent materials of the ink can be widened, but also the quality of the resulting recorded article formed with wood-free paper is hard to be deteriorated compared with inks making use of a non-aqueous liquid medium, and the liquid medium can also be removed by penetration into the wood-free paper, and moreover the liquid medium is stable to evaporation. The use of water is hence preferred even from this point of view.

The ink according to this embodiment is preferably used in recording that the ink is fed through a space as against a recording medium. More specifically, recording is conducted by bring the ink into contact with the recording medium to pressurize it like a ball point pen, the ink is pushed into the recording medium to make the mechanism according to the present invention hard to develop.

The components and the like of the ink according to this embodiment that the excellent effects are achieved by the mechanism described above will hereinafter be described.

The two organic compounds incompatible with each other, which constitute the ink according to this embodiment, mean those undergoing phase separation in a lamellar state like, for example, water and oil when only the organic compounds are mixed.

Specifically, in three components of the two organic compounds incompatible with each other and water used as a solvent, the organic compounds are dissolved in water as the solvent. When water as the solvent is evaporated under an environment of, for example, 50° C., however, the two organic compounds are separated from each other. In particular, when the two organic compounds are those undergoing liquid—liquid separation as water as the solvent is evaporated, the mechanism according to this embodiment is easier to be developed.

The liquid medium for these organic compounds are selected from among a wide variety of liquids in view of the combination of the two organic compound in compatible with each other and its compatibility with these organic compounds. However, it is particularly preferred that the liquid medium be determined to be water. The reasons for it include stability of the resulting ink, and besides problems of quality and the like when a non-aqueous liquid medium is used, which have been mentioned in the above-described mechanism, and ease of selecting the two organic compound compatible with each other.

The two organic compound in compatible with each other may be any compounds so far as they undergo phase separation in a lamellar state like, for example, water and oil when only the organic compounds are mixed, as described above. However, for example, those one of which has a solubility parameter of at least 15 and the other of which has a solubility parameter of at most 13 are preferred. If the solubility parameter values of both compounds are too close, they become liable to be compatible with each other, and so the effects of the present invention may be hard to develop in some cases. Incidentally, the solubility parameter values as shown herein are values determined in accordance with the Fedors method.

One (first organic compound) of the two organic compound incompatible with each other preferably has a glycerol group. The glycerol group has strong hydrating force and is easy to serve as the compound on the water side of "water and oil" shown in the above-described specific example of the phenomenon of the present invention. Among such compounds, sugar alcohols as monomers, such as glycerol, xylitol and erythritol, and sugar alcohols as dimers and trimers, such as glycerol and diglycerol.

Further, ethylene oxide, propylene oxide or combination thereof may be added as substituents to the compounds mentioned above. Among these, those having at least 3 hydroxyl groups and those liquid at normal temperature are particularly preferred. The content of these compounds in the ink is preferably controlled to 1.0 to 30% by weight, particularly 5.0 to 20% by weight based on the total weight of the ink. However, the present invention is not limited thereto according to a recording medium used.

The other (second organic compound) of the two organic compounds incompatible with each other will now be described. As a compound corresponding to the second organic compound against the first compound described above, is preferably used, for example, a nonionic compound. This is due to the fact that the nonionic surfactant better develops the above-described mechanism compared with surfactants having a polar group.

The nonionic surfactant usable as the second organic compound preferably undergoes no phase separation in a state of an aqueous solution from the aqueous solution, This is due to the fact that when an ink is prepared with water as a liquid medium, the ink can be inhibited or prevented from becoming unstable. This apparently indicates that the nonionic surfactant is preferably used in a state uniformly dissolved or dispersed in water. In particular, a nonionic surfactant, which forms a state of an emulsion in water, may preferably selected. It is further preferred that the content of the nonionic surfactant in the ink be selected within a range sufficient to retain the emulsion state in the state of the aqueous solution, since the fear of stability in the ink is eliminated.

Among the nonionic surfactants, those having an HLB of at most 13 may preferably be used in this embodiment. In general, those having an HLB exceeding 13 become too hydrophilic. However, the use of the nonionic surfactant having an HLB of at most 13 permits well developing the above-described mechanism that the 2 organic compounds incompatible with each other, which are components of the ink according to this embodiment, undergo phase separation on the surface of a recording medium to form an interface by the ink components between the ink and the atmosphere, thereby making the coloring ability including fluorescence intensity good.

When that having a nature between water and oil, in other words, that having a cloud point is used as the surfactant, the coloring ability including fluorescence properties is improved in the phase containing the surfactant. This is considered to be attributable to the fact that the compound exhibiting fluorescence and/or the coloring material exhibiting fluorescence is dissolved and/or dispersed in a substantially monomolecular state, which is the best state to the coloring ability including fluorescence properties, in the phase containing the surfactant, a supersaturated portion thereof is dissolved and/or dispersed in a phase incompatible with the surfactant, thereby well developing the coloring ability including fluorescence properties.

The specific content of the nonionic surfactant in the ink according to this embodiment is preferably controlled to at least 1% by weight, more preferably 1 to 20% by weight based on the total weight of the ink. When the content falls within this range, the above-described mechanism can be better developed, and moreover balance of print quality, for example, balance between feathering, which is whisker-like blur, and fixing ability or concentration can be prevented from being deteriorated.

Among the nonionic surfactants satisfying the above-described requirements, particularly preferable compounds include compounds represented by the following general formula (I) and the following compounds (II) to (VII).

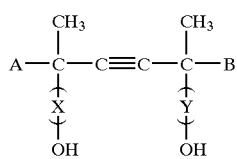
(I)

wherein A and B are, independently of each other, $C_nH_{2n+1}$ (n being an integer of 1 to 10), and X and Y are, independently of each other, a ring-opening ethylene oxide unit and/or a ring-opening propylene oxide unit.

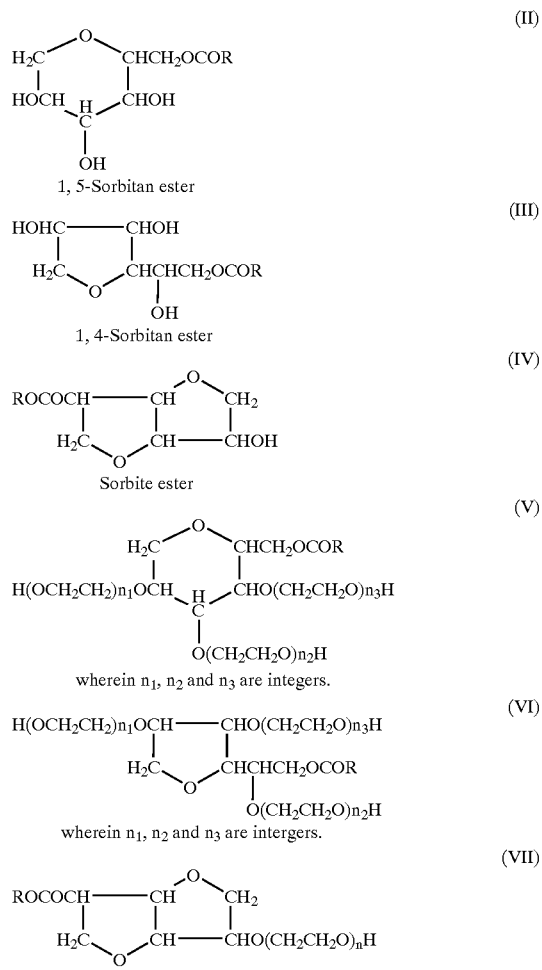

(R: long chain alkyl group of a fatty acid such as stearyl lauryl oleic groups, n is an integer)

Among the nonionic surfactants represented by the general formula (I), compounds represented by the following general formula (VIII) are particularly preferred.

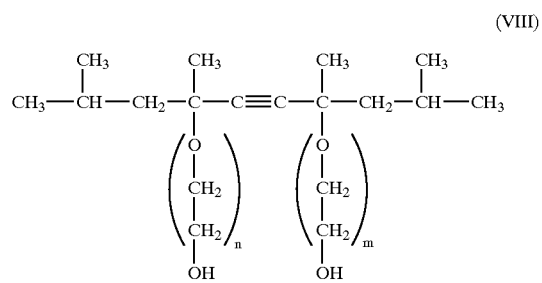
(VIII)

wherein m and n are integers.

In the ink according to this embodiment, the compound exhibiting fluorescence properties and the coloring material exhibiting fluorescence properties, which are the component (ii) of the ink, will be described. The effect by the above-described mechanism is fully developed when a compound exhibiting fluorescence properties or a fluorescent coloring material is used. Further, since the ink according to this embodiment tends to exhibit better results in an aqueous system making use of water as the liquid medium by virtue of the above-described reasons, it is preferred that water-soluble compounds and coloring materials soluble in water or hydrophilic compounds and coloring materials be used as the compound exhibiting fluorescence properties and fluorescent coloring material used in the ink according to this embodiment.

The water-soluble or hydrophilic compounds and coloring materials exhibiting fluorescence properties as referred to in the present invention include, for example, compounds and coloring materials (for example, dyes) soluble in water by themselves, and also compounds and coloring materials which are hydrophobic in themselves, but made hydrophilic by treating the surfaces thereof and seem to be dissolved in water by a method of emulsifying them in water, or the like. However, a technique that a coloring material is dispersed by using a resin as a dispersing agent, like pigment dispersion is not included. The reason for it is that this type of coloring material is hard to develop the effect by the above-described mechanism, and moreover it may not be said to be a very preferable selection from the viewpoint of reliability of the resulting ink. All the states of the compounds exhibiting fluorescence properties and fluorescent coloring materials in such a liquid medium as described above will hereinafter be represented as "dissolution" unless expressly noted.

As the compounds exhibiting fluorescence properties and fluorescent coloring materials used, are particularly preferred those containing any of the following atomic groups

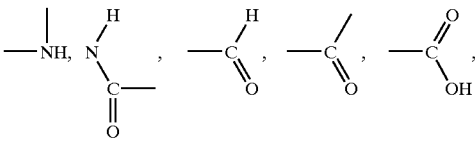

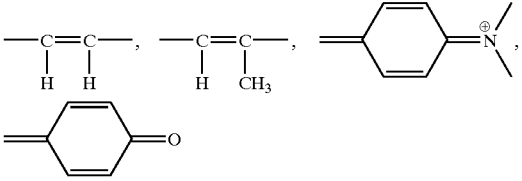

Specific examples of the fluorescent coloring materials containing any of such atomic groups as described above include the following compounds.

| Name of dye | Structure | Color under daylight | Fluorescent color |
|---|---|---|---|
| Brilliant-sulfoflavin FF (C.I. 56205) | | Yellow | Green to yellowish green |
| Basic Yellow HG (C.I. 46040) | | Yellow | Greenish yellow to yellow |
| Eosine (C.I. 45380) | | Red | Yellow to orange |

-continued

| Name of dye | Structure | Color under daylight | Fluorescent color |
|---|---|---|---|
| Rhodamine 6G (C.I. 45160) | [structure] | Red | Yellow to orange |
| Rhodamine B (C.I. 45170) | [structure] | Pink | Orange to red |

| Name of pigment | Structure |
|---|---|
| Lumogen L Yellow | [structure] |
| Lumogen L Brilliant Yellow | [structure] |
| Lumogen L Yellow Orange | [structure] |
| Lumogen L Red Orange | [structure] |

As the compounds exhibiting fluorescence properties, may be used, for example, fluorescent brightening agents commonly used.

The content of such the compounds exhibiting fluorescence properties and/or fluorescent coloring materials as mentioned above in the ink is preferably controlled to at most 1.5% by weight, more preferably at most 1.0% by weight. The compound exhibiting fluorescence properties and/or fluorescent coloring material has a nature that when its content in the ink exceeds a certain value, the fluorescence intensity of the ink is lowered (the phenomenon refers to as concentration quenching). For this reason, the concentration quenching cannot be prevented by the above-described mechanism if the concentration exceeds 1.5% by weight. When only the fluorescence properties are considered to be most important, it is particularly preferred that the content be at most 0.5% by weight.

From the viewpoint of the stability of the ink, a monohydric alcohol may also be additionally used in combination in the ink according to this embodiment. The monohydric alcohol has an effect to mix water with oil like, for example, dehydration of gasoline. This indicates that the monohydric alcohol is preferably used in combination in the ink from the viewpoint of the stability of the ink upon development of the above-described mechanism. In addition, the monohydric alcohol has a good effect for evaporation and penetration into a recording medium when the resulting ink is applied to the recording medium. Therefore, the monohydric alcohol is useful for better developing the effect of the present invention. The content of the monohydric alcohol in the ink according to this embodiment is 0.1 to 20% by weight, preferably 0.5 to 10% by weight based on the total weight of the ink. Specific examples of the monohydric alcohol usable as a component of the inks according to this embodiment include ethanol, isopropanol and n-butanol.

A water-holding agent may also be used in combination in the inks according to this embodiment. As the water-holding agent, may be preferably used a compound selected from urea and urea derivatives. When at least one selected from urea and urea derivatives is contained in the ink, the stability of the ink is improved. More specifically, when the compound selected from urea and urea derivatives is contained, the mechanism that the two organic compounds incompatible with each other in the ink undergo phase separation in a lamellar state is prevented from being developed at a gas-liquid interface in a state of an ink. In addition, the selected from urea and urea derivatives also has an effect as a solvent aid, and so the use of such a compound is also preferred from the viewpoint of stability of the ink.

When the recording medium is, for example, wood-free paper, the effect by the mechanism according to the present invention is easy to develop due to the water-holding ability of the wood-free paper. More specifically, it is expected that water is held in the recording medium, whereby the time when the ink components are released into the recording medium and the atmosphere can be slowed, and so the phase separation of the two organic compounds incompatible with each other in the lamellar state is made with good results.

As the urea derivatives, compounds other than cyclic compounds are preferred, and at least one selected from alkyl derivatives of urea and ethylene oxide and/or propylene oxide adducts of urea, or a compound suitably selected from derived compounds modified by at least two of the above derivative groups is preferably used. However, the selection varies according to the amounts and kinds of individual components making up the ink. That soluble in water is preferably used. No particular limitation is imposed on the amount of such a compound used. However, it is generally contained in a range of preferably from 0.1 to 15% by weight, more preferably from 0.1 to 10% by weight based on the total weight of the ink.

In the inks according to this embodiment, may be contained various additives such as a water-soluble organic solvent, a surfactant, a rust preventive, a preservative, a mildewproofing agent, an antioxidant, anti-reducing agent, an evaporation accelerator, a chelating agent, a water-soluble polymer and a pH adjustor, as needed, As the liquid medium used in the inks according to this embodiment, water is preferably used as described above. More preferred is a mixture of water and a water-soluble organic solvent. Specific examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 1,3-dimethyl-2-imidazolidinone; triethanolamine; sulfolane; dimethyl sulfoxide; cyclic amide compounds such as 2-pyrrolidone and ϵ-caprolactam; and imide compounds such as succinimide.

In the inks according to this embodiment, a compound having a solubility parameter value between the solubility parameter values of the two organic compounds incompatible with each other is preferably used in combination with these two organic compounds. As such a compound, is particularly preferably used a glycol compound which is liquid at normal temperature. When these compounds are used in combination in the ink, the stability in a state of an ink is improved without impairing the effects of the present invention.

As a further preferred mode of the inks according to this embodiment, a compound having a vapor pressure not higher than that of triethylene glycol is also used in combination. When such a compound is used in combination, the gas-liquid interface in a state of an ink become easy to be stably retained.

Although the preferred modes of this embodiment have been described above, a compound having a solubility parameter value smaller than 12 and soluble in water is preferably used as a compound used in combination in view of generality. No particular limitation is imposed on the amount used. However, it is generally within a range of preferably from 0.1 to 15% by weight, more preferably from 0.1 to 10% by weight based on the total weight of the ink.

The content of such a water-soluble organic solvent as described above is generally within a range of preferably from 1 to 40% by weight, more preferably from 3 to 30% by weight based on the total weight of the ink. The content of water in the ink is generally within a range of from 30 to 95% by weight based on the total weight of the ink. If the content is lower than 30% by weight, the solubility of the coloring material and the like becomes deteriorated, and the viscosity of the resulting ink is also increased. It is hence not preferable to use water in such a low proportion. If the content of water exceeds 95% by weight on the other hand, an evaporating component is too great to satisfy sufficient crusting property.

In the inks according to this embodiment, a coloring material exhibiting no fluorescence properties may be contained to adjust the color tone of the inks. As the coloring material used in this case, a coloring material soluble in water is preferred from the viewpoint of stability of the resulting ink (as with the fluorescent coloring material, including those seeming to be dissolved in water by, for example, emulsification in this case). When the water fastness of a recorded article formed by the ink according to the present invention is taken into consideration, a coloring material (direct dye) directly coloring a recording medium is preferably used in view of the stability of the resulting ink as well. A coloring material having an azo group in its structure is more preferred. As the coloring material exhibiting no fluorescence properties, is preferably used a coloring material having a carboxyl group or its salt group in the structure thereof. A coloring material having only a carboxyl group or its salt group as a hydrophilic group of the coloring material is more preferred for use. Since the carboxyl group is weak in affinity for water compared with a sulfonic group, the water fastness of the recorded article formed by the ink according to the present invention can be improved.

The content of the coloring material exhibiting no fluorescence properties in the inks according to this embodiment is preferably not lower than the content of the coloring material exhibiting fluorescence properties as described above. When an ink is made up in such a manner, a recorded state tends to remain even when the coloring material exhibiting fluorescence properties is lacking of water resistance, and fluorescence is lost by contact of the recorded article with water, so that it is prevented to completely lose the details recorded. However, when the coloring material exhibiting no fluorescence properties is selected, it is preferable that it be suitably selected according to the developed state of fluorescence properties in a recorded article formed by the compound exhibiting fluorescence properties and/or the coloring material exhibiting fluorescence properties, or balance with the coloring ability thereof.

Specific examples of the coloring material exhibiting no fluorescence properties include Direct Black 168, Direct Black 154, Direct Yellow 145, Direct Yellow 86, Direct Red 227, Direct Blue 199 and coloring materials represented by the following general formulae (A) to (C) in the form of a free acid. However, the present invention is not limited to these coloring materials.

Coloring material represented by the general formula (A) in the form of a free acid:

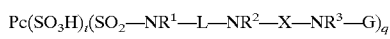

wherein Pc is a metallized phthalocyanine nucleus, $R^1$, $R^2$ and $R^3$ are, independently of one another, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), alkenyl group (for example, an alkenyl group having 1 to 20 carbon atoms), substituted alkenyl group (for example, an alkenyl group at least one hydrogen of which has been substituted by halogen (fluorine, chlorine, bromine or the like), an alkoxy group having 1 to 3 carbon atoms, or the like), aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like), L is a divalent organic linking group (for example, a methylene or ethylene group), X is a carbonyl group or a group represented by the following formula (2), (3) or (4)

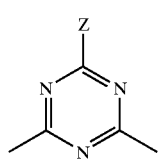

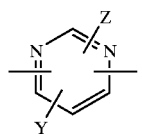

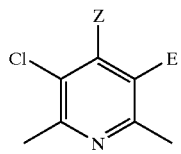

wherein Z in each of the formulae (2) to (4) is $NR^4R^5$, $SR^6$ or $OR^6$, Y in the formula (3) is H, Cl, Z, $SR^7$ or $OR^7$, E in the formula (4) is Cl or CN, $R^4$, $R^5$, $R^6$ and $R^7$ are, independently of one another, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), aryl group (for example, a phenyl group), substituted aryl group (for example, a phenyl group substituted by at least one substituent selected from halogen (fluorine, chlorine, bromine and the like), alkoxy groups having 1 to 3 carbon atoms, linear or branched alkyl groups having 1 to 3 carbon atoms, and the like), aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like), or $R^4$ and $R^5$ may be form a 5- or 6-membered ring together with nitrogen, G is a colorless organic residue substituted by 1 or 2 COSHs or COOHs, and t+q is 3 or 4.

Examples of the compounds represented by the general formula (A) include C.I. Direct Blue 307, and Exemplified Coloring Material (1):

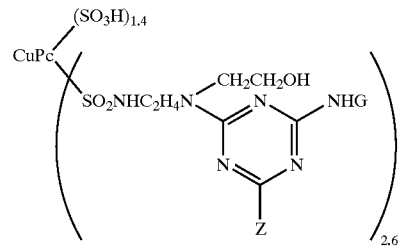

Coloring material represented by the general formula (B) in the form of a free acid:

wherein J is the following formula

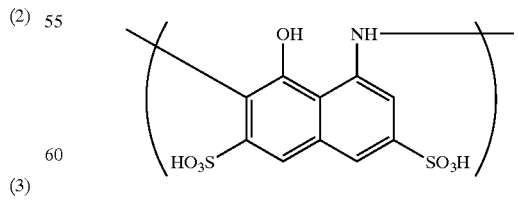

$Ar^1$ and $Ar^2$ are, independently of each other, an aryl group or substituted aryl group, at least one of $Ar^1$ and $Ar^2$ is a substituted aryl group having at least one substituent selected from COOH and COSH, $R^1$ and $R^2$ are, independently of each other, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), alkenyl group (for example, an alkenyl group having 1 to 20 carbon atoms), or substituted alkenyl group (for example, an alkenyl group at least one hydrogen of which has been substituted by halogen (fluorine, chlorine, bromine or the like), an alkoxy group having 1 to 3 carbon atoms, or the like), L is a divalent organic linking group (for example, —NH-φ-NH—, in which φ is a phenylene group), n is 0 or 1, and X is a carbonyl group or a group represented by the following formula (2), (3) or (4)

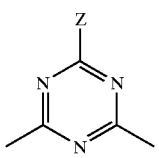
(2)

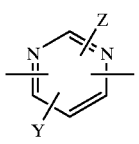
(3)

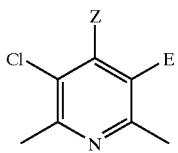
(4)

wherein Z in each of the formulae (2) to (4) is $NR^3R^4$, $SR^5$ or $OR^5$, Y in the formula (3) is H, Cl, Z, $SR^6$ or $OR^6$, E in the formula (4) is Cl or CN, $R^4_1$, $R^5$, $R^6$ and $R^7$ are, independently of one another, H, alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), alkenyl group (for example, an alkenyl group having 1 to 20 carbon atoms), substituted alkenyl group (for example, an alkenyl group at least one hydrogen of which has been substituted by halogen (fluorine, chlorine, bromine or the like), an alkoxy group having 1 to 3 carbon atoms, or the like), aryl group (for example, a phenyl group), substituted aryl group (for example, a phenyl group substituted by at least one substituent selected from halogen (fluorine, chlorine, bromine and the like), alkoxy groups having 1 to 3 carbon atoms, linear or branched alkyl groups having 1 to 3 carbon atoms, and the like), aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like), or $R^4$ and $R^5$ may be form a 5- or 6-membered ring together with nitrogen, with the proviso that the compounds represented by the general formula (B) have at least the same number of groups selected from COOH and COSH as $SO_3H$.

Examples of the compounds represented by the general formula (B) includes C.I. Direct Violet 107 and Exemplified Coloring Material (2):

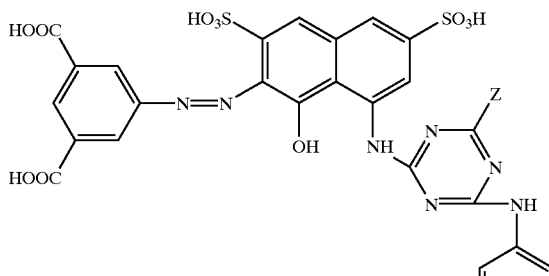

Exemplified Coloring Material (3):

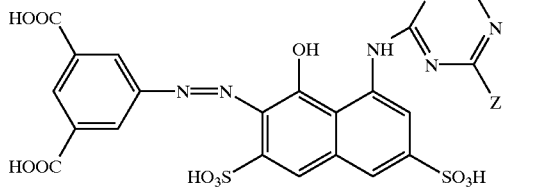

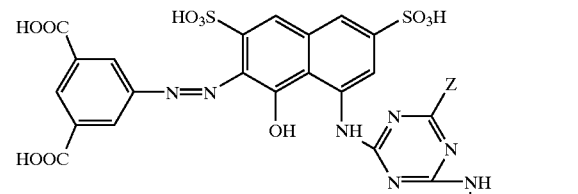

Exemplified Coloring Material (4):

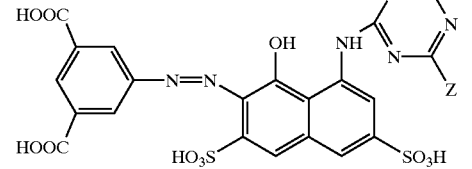

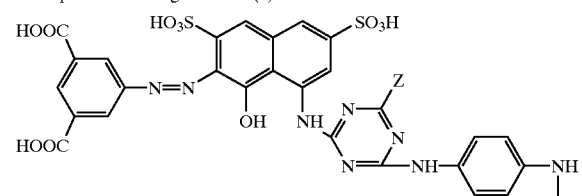

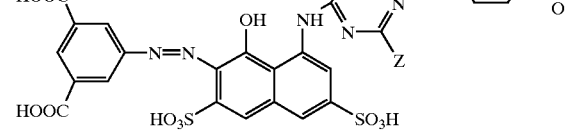

Exemplified Coloring Material (5):

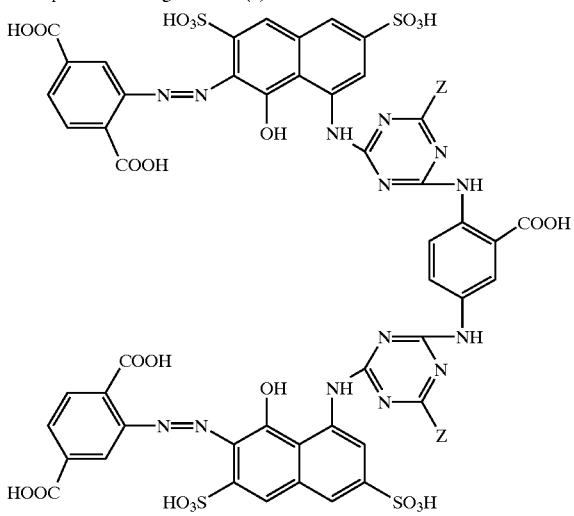

Coloring material represented by the general formula (C) in the form of a free acid:

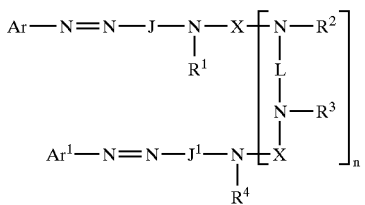

(C)

wherein Ar and Ar$^1$ are, independently of each other, an aryl group (for example, a phenyl group) or substituted aryl group, at least one of Ar and Ar$^1$ is a substituted aryl group having a substituent selected from the group consisting of sulfonic, carboxyl and thiocarboxyl groups, J and J$^1$ are, independently of each other, a group represented by the following formula (2), (3) or (4)

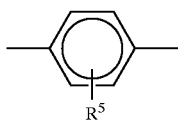

(2)

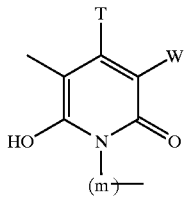

(3)

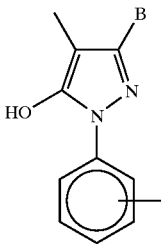

(4)

wherein R$^5$ in the formula (2) is selected from hydrogen, alkyl groups (for example, linear or branched alkyl groups having 1 to 20 carbon atoms), substituted alkyl groups (for example, alkyl groups at least one hydrogen of which has been substituted by halogen (fluorine, chlorine, bromine or the like), an alkoxy group having 1 to 3 carbon atoms, or the like), alkoxy groups (for example, methoxy and ethoxy groups), halogen (for example, fluorine, chlorine and bromine), CN, ureide group and NHCOR$^6$ (R$^6$ being selected from hydrogen, alkyl groups (for example, linear or branched alkyl groups having 1 to 20 carbon atoms), substituted alkyl groups (for example, alkyl groups at least one hydrogen of which has been substituted by halogen (fluorine, chlorine, bromine or the like), an alkoxy group having 1 to 3 carbon atoms, or the like), aryl groups (for example, a phenyl group), substituted aryl groups (for example, a phenyl group substituted by at least one substituent selected from halogen (fluorine, chlorine, bromine and the like), alkoxy groups having 1 to 3 carbon atoms, linear or branched alkyl groups having 1 to 3 carbon atoms, and the like), aralkyl groups (for example, phenylmethyl and phenylethyl groups), and substituted aralkyl group (for example, aralkyl groups the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like)), T in the formula (3) is an alkyl group, W is selected from hydrogen, CN CONR$^{10}$R$^{11}$, pyridinium group and carboxyl group, (R$^{10}$ and R$^{11}$ being, independently of each other, selected from hydrogen, alkyl groups (for example, linear or branched alkyl groups having 1 to 20 carbon atoms) and substituted alkyl groups (for example, alkyl groups at least one hydrogen of which has been substituted by halogen (fluorine, chlorine, bromine or the like), an alkoxy group having 1 to 3 carbon atoms, or the like)), m is an alkylene group having 2 to 3 carbon atoms, B in the formula (4) is selected from hydrogen, alkyl groups and carboxy group, R$^4$, R$^5$, R$^6$ and R$^7$ in the formula (C) are, independently of one another, selected from H, alkyl groups (for example, linear or branched alkyl groups having 1 to 20 carbon atoms) and substituted alkyl groups (for example, alkyl groups at least one hydrogen of which has been substituted by halogen (fluorine, chlorine, bromine or the like), an alkoxy group having 1 to 3 carbon atoms, or the like), L is a divalent organic linking group (for example, —NH-φ-NH—, in which φ is a phenylene group), n is 0 or 1, and X is a carbonyl group or a group represented by the following formula (5), (6) or (7)

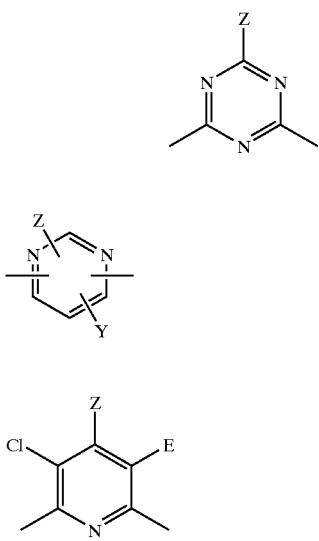

(5)

(6)

(7)

wherein Z in each of the formulae (5) to (7) is selected from $OR^7$, $SR^7$ and $NR^8R^9$, Y is selected from hydrogen, Cl and Z, E is selected from Cl and CN, $R^7$, $R^8$ and $R^9$ are, independently of one another, hydrogen, alkenyl group (for example, an alkenyl group having 1 to 20 carbon atoms), substituted alkenyl group (for example, an alkenyl group at least one hydrogen of which has been substituted by halogen (fluorine, chlorine, bromine or the like), an alkoxy group having 1 to 3 carbon atoms, or the like), alkyl group (for example, a linear or branched alkyl group having 1 to 20 carbon atoms), substituted alkyl group (for example, an alkyl group at least one hydrogen of which has been substituted by halogen (fluorine, chlorine, bromine or the like), an alkoxy group having 1 to 3 carbon atoms, or the like), aryl group (for example, a phenyl group), substituted aryl group (for example, a phenyl group substituted by at least one substituent selected from halogen (fluorine, chlorine, bromine and the like), alkoxy groups having 1 to 3 carbon atoms, linear or branched alkyl groups having 1 to 3 carbon atoms, and the like), aralkyl group (for example, a phenylmethyl or phenylethyl group), or substituted aralkyl group (for example, an aralkyl group the aryl group of which has been substituted by at least one substituent selected from halogen (fluorine, chlorine, bromine and the like), linear or branched alkyl groups having 1 to 3 carbon atoms, alkoxy groups having 1 to 3 carbon atoms, and the like), or $R^8$ and $R^9$ may be form a 5- or 6-membered ring together with nitrogen, with the proviso that when the compounds of the general formula (C) have no sulfonic group, the compounds have at least 2 groups selected from carboxyl and thiocarboxyl groups, or the compounds of the general formula (C) have at least the same number of groups selected from carboxyl and thiocarboxyl groups as the sulfonic group.

Examples of the compounds represented by the general formula (C) includes

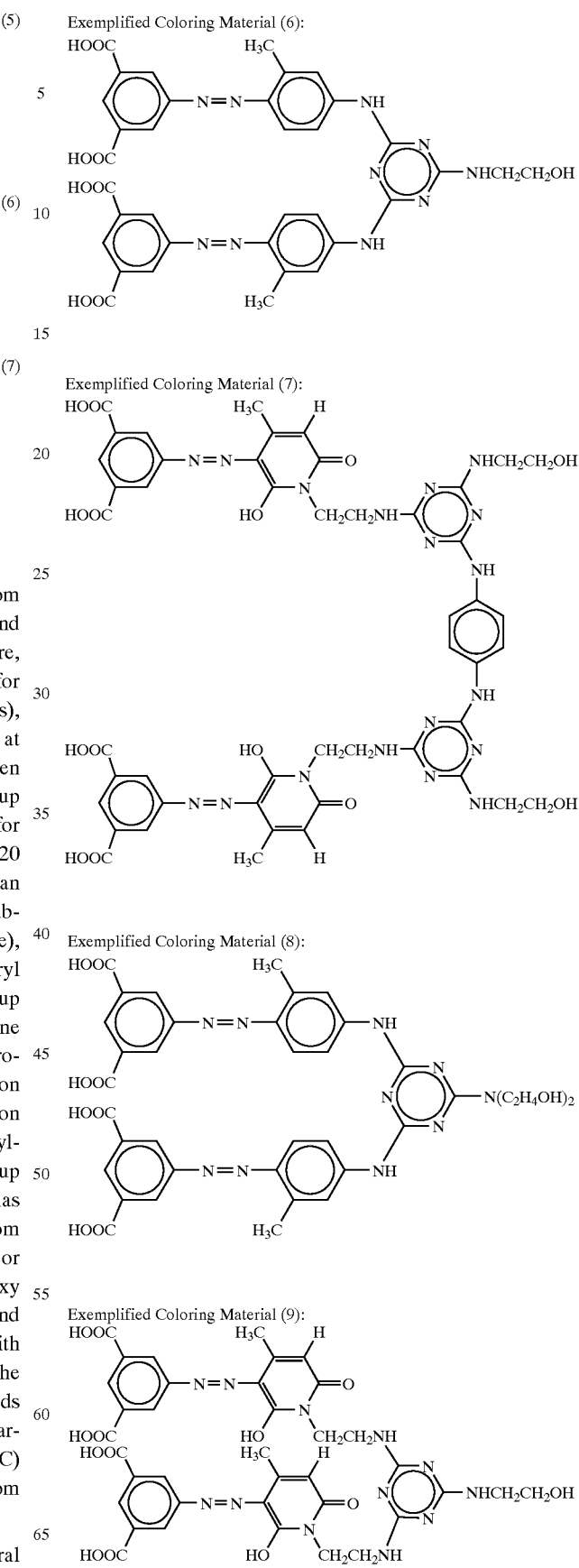

-continued

Exemplified Coloring Material (10):

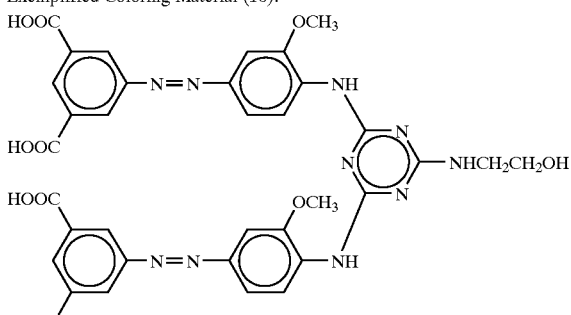

Exemplified Coloring Material (11):

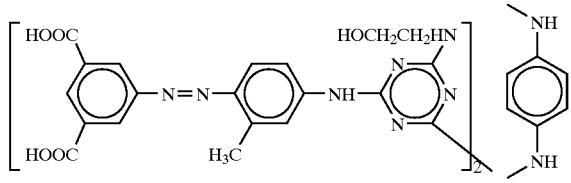

No particular limitation is imposed on the amount of such coloring material exhibiting no fluorescence properties as described above to be used. However, it is generally within a range of preferably from 0.1 to 15% by weight, more preferably from 0.1 to 10% by weight based on the total weight of the ink.

For example, the inks according to this embodiment preferably have a surface tension of at most 40 mN/m (dyn/cm) because in order to develop the above-described mechanism, it is preferred from the viewpoint of development of the effect that for example, an ink droplet spreads after recording. Further, the pH of the inks according to this embodiment is preferably at least 8 from the viewpoint of stability of the inks.

In the inks according to this embodiment, it is preferred that an alkali metal ion and an ammonium ion be used in combination as counter ions to these coloring materials.

When both ions are used in combination, the stability and ejection stability of the resulting ink are improved when the ink is used in ink-jet recording. As examples of the alkali metal ion, may be mentioned $Li^+$, $Na^+$ and $K^+$. The inks according to this embodiment are preferably adjusted to nonionicity in an ink system from which the coloring material and additives have been removed.

In the inks according to this embodiment, it is preferred from the viewpoint of increasing the fluorescence intensity of the resulting image that the compound exhibiting fluorescence properties and/or the coloring material exhibiting fluorescence properties be contained in at least a concentration sufficient to exhibit the maximum fluorescence intensity in the inks. Inferentially, the reason for it is considered to be due to the fact that since the apparent concentration of a coloring material is lowered by feathering or bleeding, penetration and the like of an ink when recording is conducted with a water-based ink on a recording medium, good coloring is retained on a selected recording medium when recording is conducted on the recording medium with the ink made up in such a manner.

The fluorescent inks according to this embodiment made up in the above-described manner may also be used as inks for general writing utensils, but are particularly effective when used in ink-jet recording. Ink-jet recording methods include a recording method in which mechanical energy is applied to an ink to eject droplets of the ink, and a recording method in which thermal energy is applied to an ink to eject droplets of the ink by bubbling of the ink. The inks according to this embodiment are particularly suitable for use in an ink-jet recording method of a type that an ink is ejected by the bubbling phenomenon of the ink caused by thermal energy. This recording method has a feature that the ejection of the ink becomes extremely stable, and no satellite dots generate. In this case, however, the thermal properties (for example, specific heat, coefficient of thermal expansion, heat conductivity, etc.) of the inks may be controlled in some cases.

From the viewpoint of making the matching of the inks with an ink-jet head good, the inks according to this embodiment may desirably be controlled so as to have, as their own physical properties at 25° C., a surface tension of 30 to 40 mN/m (dyn/cm) and a viscosity of 15 cP or lower, preferably 10 cP or lower, more preferably 5 cP or lower. In order to control the inks to the above physical property values to solve problems in plain paper, the amount of water contained in the inks according to this embodiment is preferably controlled to not less than 50% by weight, but not more than 98% by weight, more preferably not less than 60% by weight, but not more than 95% by weight.

(Second Embodiment)

The ink according to the second embodiment of the present invention will now be described.

The ink according to the second embodiment has a feature that a glycol compound having a vapor pressure higher than that of diethyleneglycol is additionally contained in the above-described ink according to the first embodiment. According to the ink according to this embodiment, in which such a compound is used in combination, the coloring ability including fluorescence intensity is made good, and so the fluorescence properties and coloring ability of the resulting recorded article are markedly improved, and moreover a separate excellent effect that the drawback of the conventional recorded articles exhibiting the fluorescence properties that the fluorescence intensity of a fluorescent coloring material exposed to light is lowered with time can be effectively prevented is achieved.

With respect to the glycol compound having a vapor pressure higher than that of diethyleneglycol, which makes a difference from the ink according to the first embodiment, this compound is preferably a compound which dissolves or disperses the 2 organic compounds incompatible with each other therein, and for example, its solubility parameter value is preferably between the solubility parameter values of the 2 organic compounds incompatible with each other. When such a compound is used in combination, the drawback of the conventional recorded articles exhibiting the fluorescence properties that the fluorescence intensity of the fluorescent coloring material exposed to light is lowered with time can be effectively prevented as described above. Specific examples of such a compound vary according to the two organic compounds used. When for example, the above-described organic compound having a glycerol group and nonionic surfactant are used as the two organic compounds, however, it is preferable to use a glycol compound. Examples of such a compound include glycol compounds having a vapor pressure not lower than that of ethylene glycol, specifically, ethylene glycol (Vapor pressure: 6.7 Pa at 20° C.) and diethylene glycol (vapor pressure: <1.3 Pa at 20° C.).

Figure 12:
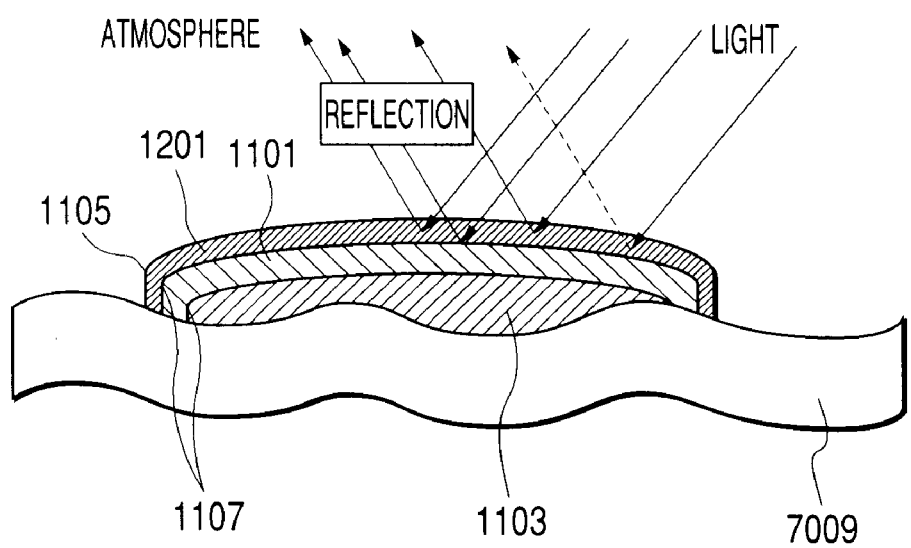
FIG. 12 illustrates the mechanism of coloring including fluorescence intensity according to the present invention.

With respect to the reason why the ink according to this embodiment exhibits such effects as described above, the present inventors are considered to be attributable to evaporation of the compound having a vapor pressure not lower than that of diethyleneglycol, for example, ethyleneglycol or diethylene glycol on a recording medium. More specifically, since the evaporation of such a compound is comparatively mild, said compound is contained in plenty in the ink just after an ink droplet is applied to the recording medium. Therefore, it is considered that said compound is present at the liquid—liquid interface 1107 between the layers 1101 and 1103 in FIG. 11, or at least one of the liquid—liquid interfaces 1107 between the layers 1201 and 1203 and between the layers 1203 and 1205 in FIG. 12 to inhibit the formation of a clear interface. Namely, a recorded portion by the ink according to this embodiment exhibits weaker fluorescence intensity that that exhibited by a recorded portion obtained by an ink not containing said ink just after recording. However, said compound gradually evaporates with time. As a result, the liquid—liquid interface is made clear, resulting in formation of a recorded portion suitable for obtaining high fluorescence intensity. The fluorescence-emitting ability of the compound exhibiting fluorescence properties or the coloring material exhibiting fluorescence properties may be lowered with time in some cases according to an environment in which the recording article is placed. However, the apparent fluorescence intensity of the recorded portion formed by the ink according to this embodiment is extremely effectively prevented from being deteriorated with time or scarcely deteriorated or may be increased in some cases. Accordingly, when a recorded article is expected to have longer fluorescence properties, it is preferable to use the ink according to this embodiment.

As a preferred method and an apparatus for conducting recording by using the inks according to the present invention, may be mentioned a method and an apparatus in which thermal energy corresponding to recording signals is applied to an ink within a recording head, and ink droplets are generated by the thermal energy.

Figure 2:
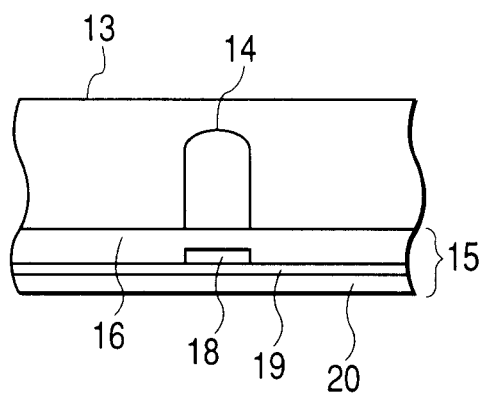
FIG. 2 is a transverse cross-sectional view of the head of the ink-jet recording apparatus.
Figure 3:
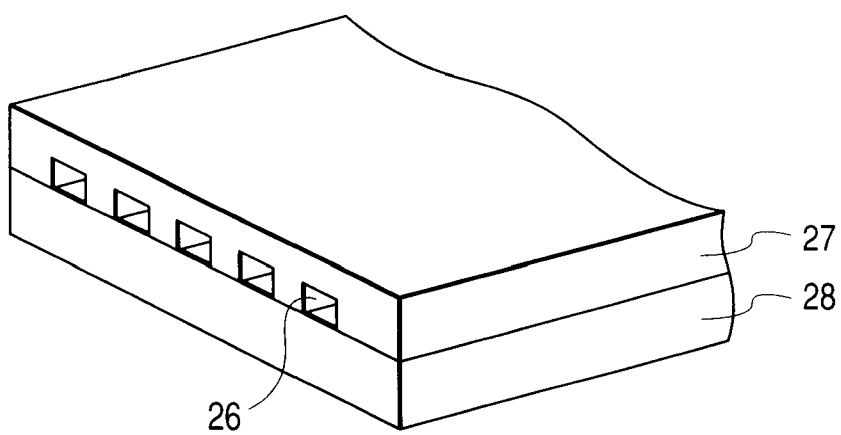
FIG. 3 is a perspective view of the appearance of a multi-head which is an array of such heads as shown in FIG. 1.

Examples of the construction of a head, which is a main component of such an apparatus, are illustrated in FIGS. 1, 2 and 3. FIG. 1 is a cross-sectional view of a head 13 taken along the flow path of ink, and FIG. 2 is a cross-sectional view taken along line 2—2 in FIG. 1. The head 13 is formed by bonding a glass, ceramic, silicon or plastic plate or the like having a groove 14 through which an ink is passed, to a heating head 15 which is used for thermal recording (the drawings show a thin-film head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure P. Now, upon application of electric signals to the aluminum electrodes 17-1 and 17-2, the heating head 15 rapidly generates heat at the region shown by "n" to form bubbles in the ink 21 which is in contact with this region. The meniscus 23 of the ink is projected by the pressure thus produced, and the ink 21 is ejected in the form of ink droplets 24 from the ejection orifice 22 toward a recording medium 25.

FIG. 3 illustrates an appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
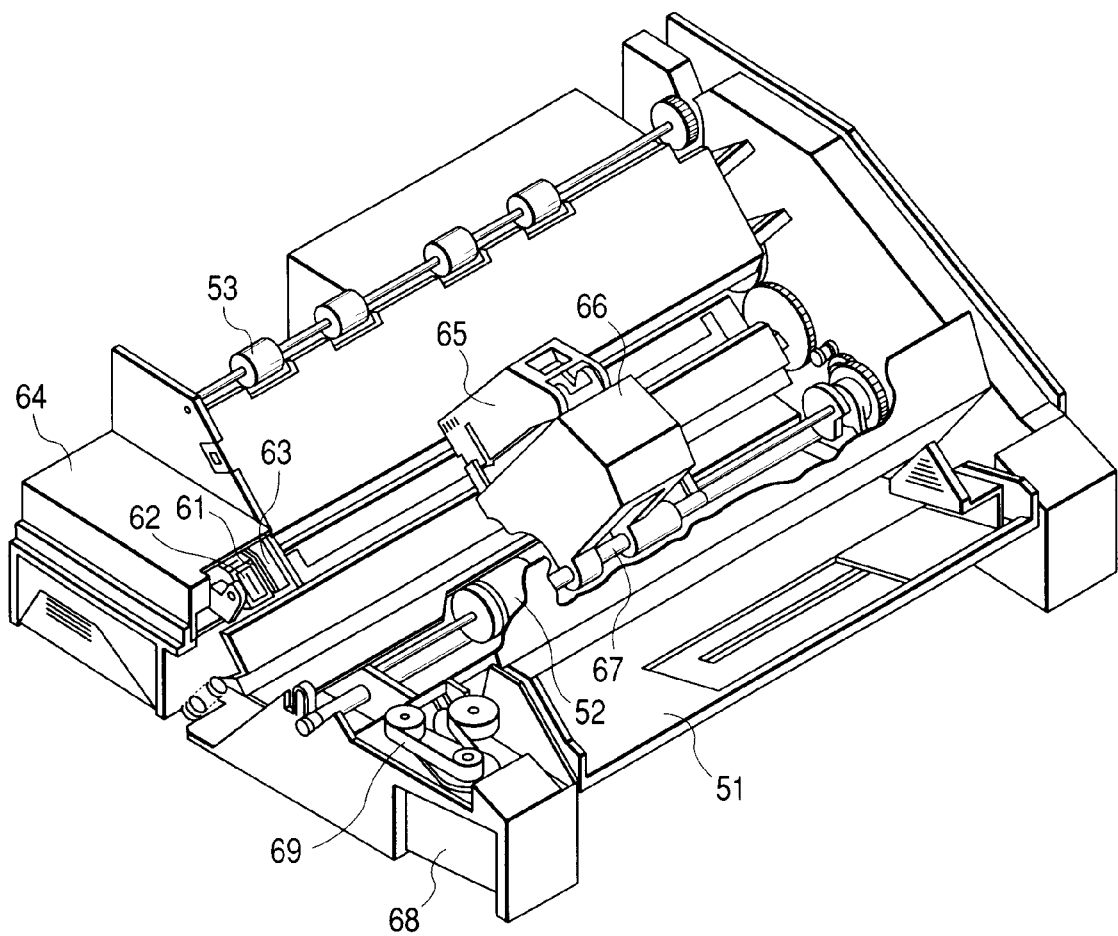
FIG. 4 is a perspective view illustrating an exemplary ink-jet recording apparatus.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of ejection openings to cap it. Reference numeral 63 denotes an ink absorbing member provided adjoiningly to the blade 61 and, similar to the blade 61, held in such a form that it protrudes into the course through which the recording head 65 is moved.

The above-described blade 61, cap 62 and ink absorbing member 63 constitute an ejection-recovery portion 64, where the blade 61 and ink absorbing member 63 remove water, dust and/or the like from the face of the ink-ejecting openings. Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
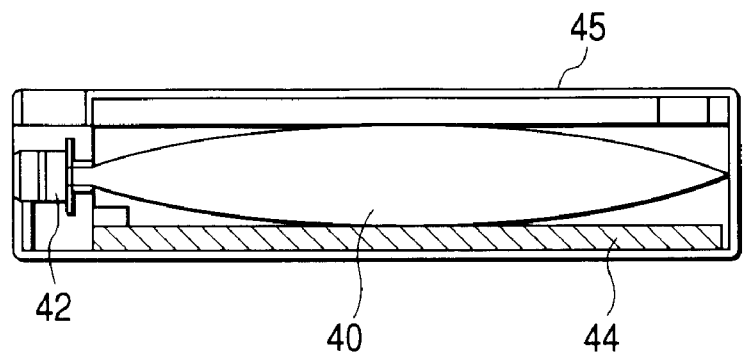
FIG. 5 is a longitudinal cross-sectional view of an ink cartridge.

FIG. 5 illustrates an exemplary ink cartridge 45 in which an ink to be fed to a head through a member for feeding the ink, for example, a tube is contained. Here, reference numeral 40 designates an ink container containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an ink absorbing member for receiving a waste ink. It is preferred that the ink container 40 be formed of a polyolefin, in particular, polyethylene, at its surface with which the ink comes into contact.

Figure 6:
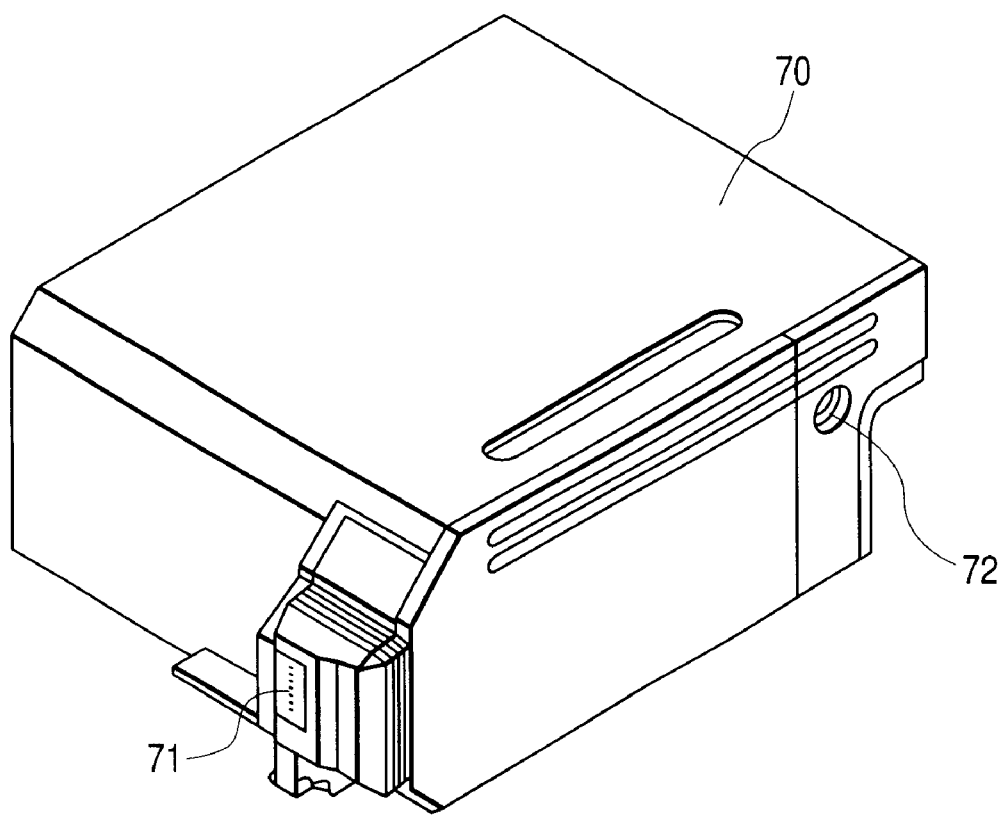
FIG. 6 is a perspective view illustrating an exemplary printing unit.

The ink-jet recording apparatus according to the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container containing an ink, for example, an ink holding member, is contained. The recording unit 70 is so constructed that the ink in such an ink holding member is ejected in the form of ink droplets through a head portion 71 having a plurality of orifices.

In the present invention, polyurethane, cellulose, polyvinyl acetate, polyolefin or a polymer formed by a condensation or polymerization reaction of organic compound(s) is preferably used as a material for the ink holding member. Further, an ink holding member composed of a porous material or having a multi-layer structure is preferably used. It is preferred that an ink holding member the direction of the multi-layer arrangement of the multi-layer structure of which is aligned in an ink discharging direction of the ink container be used. It is also preferred that an ink holding member having a contact surface with the ink container be used. Reference numeral 72 indicates an air passage for communicating the interior of the recording unit 70 with the atmosphere. This recording unit 70 is used in place of the recording head 65 shown in FIG. 4, and is detachably installed on the carriage 66.

Figure 13:
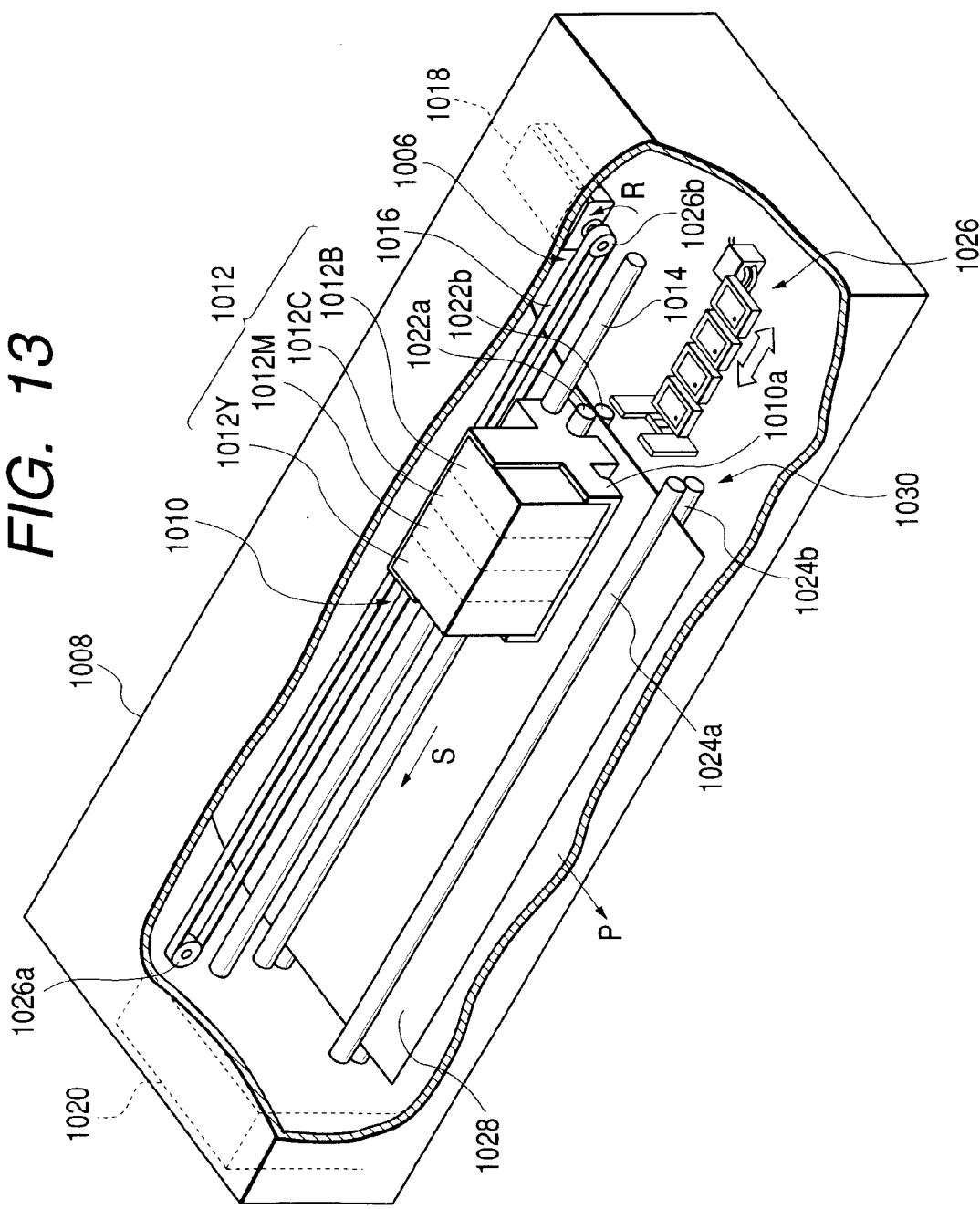
FIG. 13 is a schematic perspective view illustrating principal parts in an exemplary ink-jet printer capable of installing a liquid-ejecting head.

Other specific examples of the recording apparatus and recording heads preferably used in the present invention will hereinafter be described. FIG. 13 is a schematic perspective view illustrating principal parts of a liquid-ejecting head of an ejection system that a bubble communicates with the atmosphere upon ejection, and an exemplary ink-jet printer as a liquid-ejecting apparatus using this head.

In FIG. 13, the ink-jet printer comprises a conveying device 1030 for intermittently conveying paper 1028 as a recording medium provided along the longitudinal direction in a casing 1008 in a direction shown by an arrow P in FIG. 13, a recording part 1010 reciprocatingly moved in a direction substantially parallel to a guide shaft 1014 in a direction of an arrow S substantially perpendicular to the conveying direction P of the paper 1028 by the conveying device 1030, and a driving part 1006 for movement as a driving means for reciprocatingly moving the recording part 1010.

The conveying device 1030 comprises a pair of roller units 1022a and 1022b and a pair of roller units 1024a and 1024b arranged in substantial parallel with and in opposed relation to each other, and a driving part 1020 for driving these respective roller units. By this construction, the paper 1028 is intermittently conveyed in a state that it is held between the respective roller units 1022a and 1022b and the roller units 1024a and 1024b in a direction shown by the arrow P in FIG. 13 when the driving part 1020 of the conveying device 1030 is operated.

The driving part 1006 for movement comprises a belt 1016 wound around pulleys 1026a and 1026b respectively provided on rotating shafts oppositely arranged at a prescribed interval and a motor 1018 for driving the belt 1016 joined to a carriage member 1010a of the recording part 1010 arranged in substantial parallel to the roller units 1022a and 1022b in forward and reverse directions.

When the motor 1018 is operated to rotate the belt 1016 in a direction shown by an arrow R in FIG. 13, the carriage member 1010a of the recording part 1010 is moved by the prescribed movement in the direction shown by the arrow S in FIG. 13. When the motor 1018 is operated to rotate the belt 1016 in a direction reverse to the direction shown by the arrow R in FIG. 13, the carriage member 1010a of the recording part 1010 is moved by the prescribed movement in a direction reverse to the direction shown by the arrow S in FIG. 13. At an end of the driving part 1006 for movement, a recovery unit 1026 for conducting an ejection-recovery operation for the recording part 1010 is provided in opposed relation to an array of ink-ejection openings of the recording part 1010 at the home position of the carriage member 1010a.

In the recording part 1010, ink-jet cartridges (hereinafter may be referred merely to as "cartridges" in some cases) 1012Y, 1012M, 1012C and 1012B for respective colors, for example, yellow, magenta, cyan and black, are detachably mounted on a carriage member 1010a.

Figure 14:
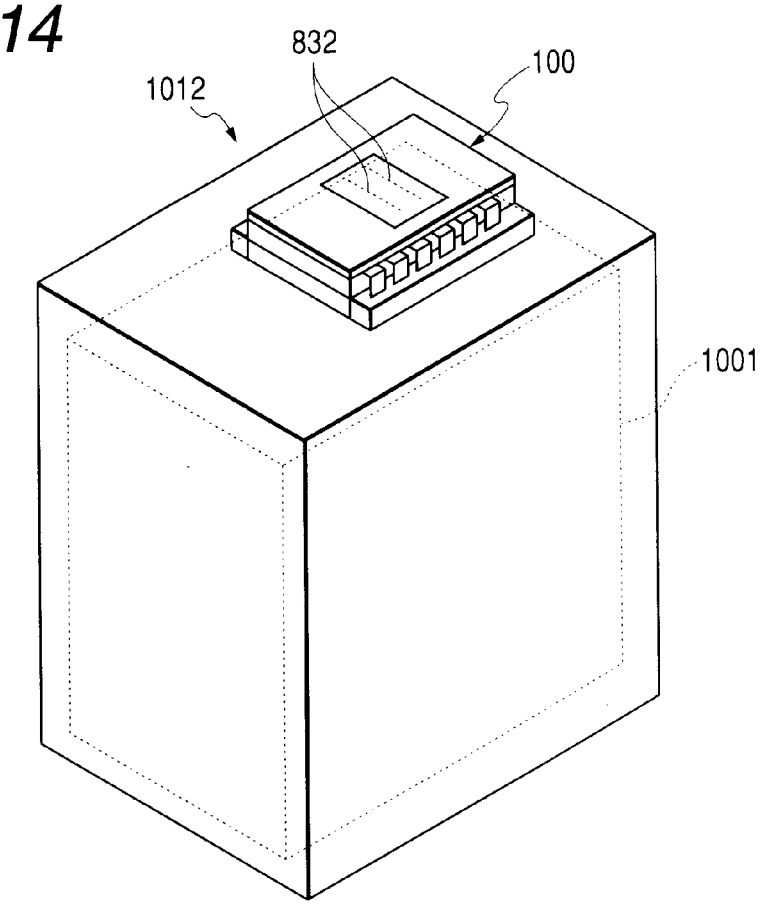
FIG. 14 is a schematic perspective view illustrating an exemplary ink-jet cartridge equipped with the liquid-ejecting head.

FIG. 14 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank 1001 for containing a liquid such as an ink.

In the ink-jet recording head 100, a great number of ejection openings 832 for ejecting the liquid are formed, and the liquid such as an ink is directed to a common liquid chamber (see FIG. 15) in the liquid-ejecting head 100 through a liquid feed passage (not illustrated) from the liquid tank 1001. The cartridge 1012 shown in FIG. 14 is so constructed that the ink-jet recording head 100 and the liquid tank 1001 are integrally formed, and the liquid can be supplied to the interior of the liquid tank 1001 as needed. However, a structure that the liquid tank 1001 is replaceably joined to this liquid-ejecting head 100 may also be adopted.

A specific example of the above-described liquid-ejecting head capable of being mounted on the ink-jet printer of such a construction will hereinafter be described in detail.

Figure 15:
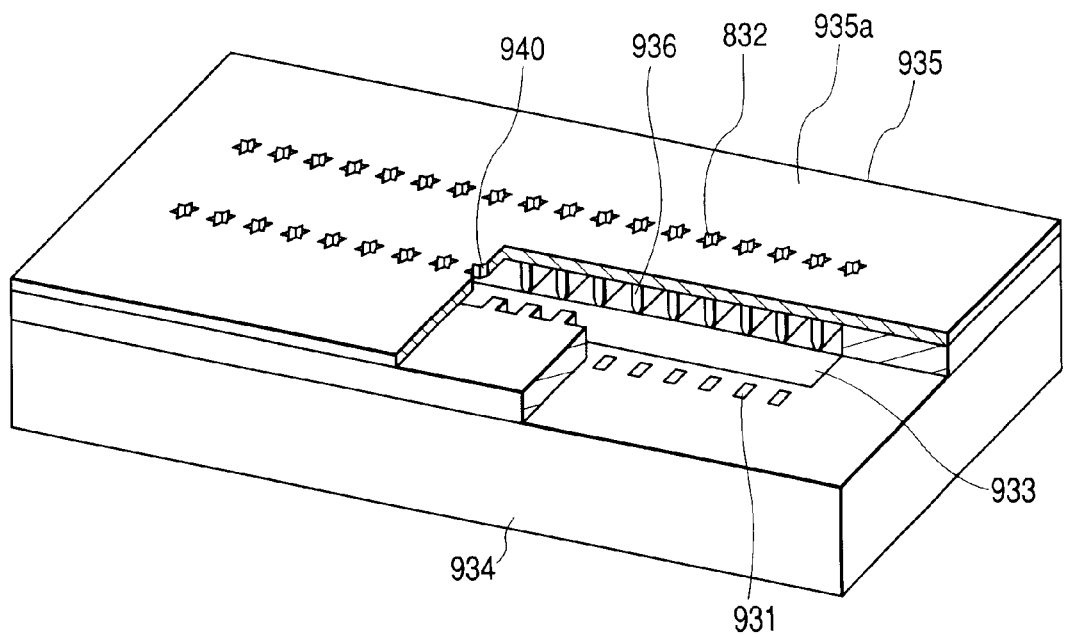
FIG. 15 is a schematic perspective view typically illustrating principal parts of an exemplary liquid-ejecting head used in the ink-jet cartridge shown in FIG. 14.

FIG. 15 is a schematic perspective view typically illustrating principal parts of a liquid-ejecting head suitable for use in the ink-jet recording apparatus of the present invention, and FIGS. 16 to 19 are front views illustrating the form of ejection openings of the liquid-ejecting head shown in FIG. 14. Incidentally, in these drawings, electrical wiring and the like for driving electrothermal conversion elements are omitted.

In the liquid-ejecting head according to this embodiment, such a substrate 934 composed of glass, ceramic, plastic or metal as illustrated in, for example, FIG. 15 is used. The material of such a substrate is not essential to the present invention and is not particularly limited so far as it functions as a part of a flow-path forming member and as a support for an ink ejection-energy-generating element, and a material layer for forming a liquid flow path and ejection openings, which will be described subsequently. Therefore, in this embodiment, the description is given in the case where an Si substrate (wafer) is used. The ejection openings can be formed on such a substrate 934. Processes therefor include a forming process by laser beam, and a process in which for example, a photosensitive resin is used as an orifice plate (ejection-opening plate) 935, which will be described subsequently, to form ejection openings by an aligner such as MPA (mirror projection aligner).

In FIG. 15, reference numeral 934 indicates a substrate equipped with electrothermal conversion elements (hereinafter may be referred as "heater" in some cases) 931 and an ink feed opening 933 formed of a long-grooved through-opening as a common liquid chamber. The heaters 931, which are thermal energy-generating means, are arranged in a zigzag form in a row on both sides of the ink feed opening 933 along the longitudinal direction thereof with an interval of, for example, 300 dpi between the electrothermal conversion elements. Walls 936 for ink flow path for forming ink flow paths are provided on the substrate 934. Further, an ejection-opening plate 935 equipped with ejection openings 832 is provided on the walls 936 for ink flow path.

In FIG. 15, the walls 936 for ink flow path and the ejection-opening plate 935 are illustrated as separate members. However, the walls 936 for ink flow path may be formed on the substrate 934 by a method such as spin coating, thereby forming the walls 936 for ink flow path and the ejection-opening plate 935 as the same member at the same time. In this embodiment, the side of the ejection-opening face (upper surface) 935a is subjected to a water-repellent treatment.

In the apparatus illustrated, a head of the serial type that recording is conducted while scanning in the direction shown by the arrow S in FIG. 13 is used to conduct recording at, for example, 1,200 dpi. Driving frequency is 10 kHz, and ejection is conducted at the shortest time interval of 100 µs in one ejection opening.

Figure 16:
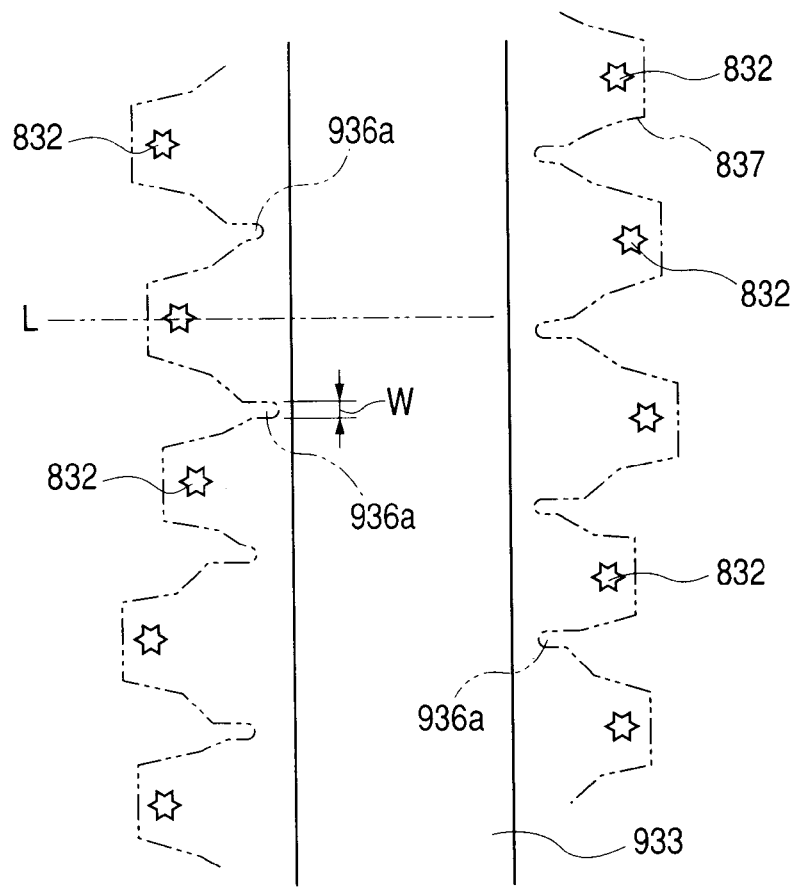
FIG. 16 is a conceptual view illustrating a part extracted from the exemplary liquid-ejecting head shown in FIG. 14.
Figure 19:
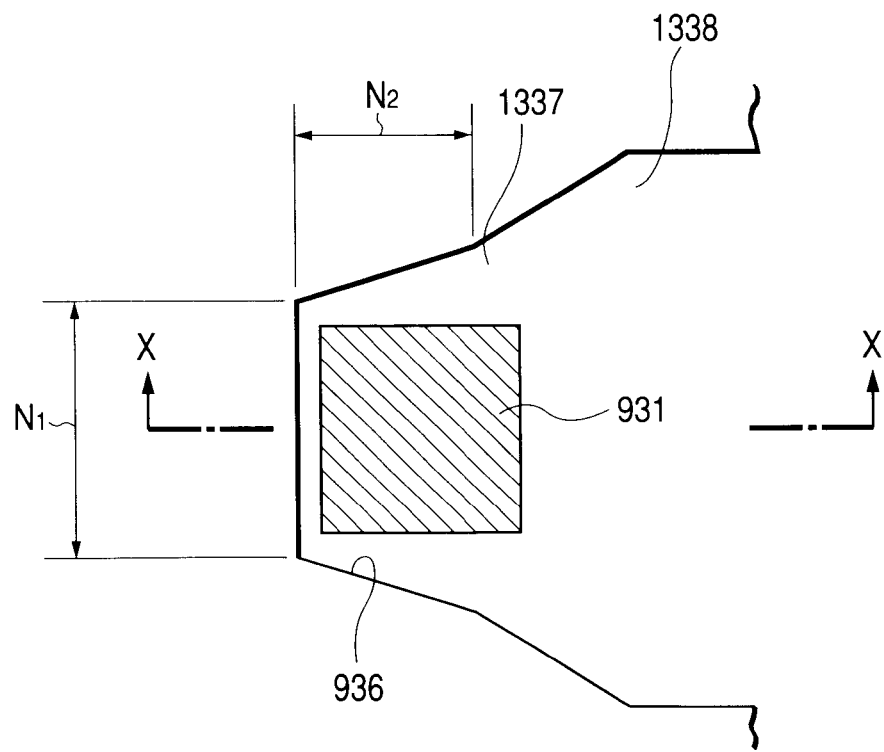
FIG. 19 typically illustrates a principal part in FIG. 16.

As an example of dimensions of the head, a partition wall 936a for isolating adjacent nozzles from each other from the viewpoint of fluid has a width w of 14 µm as illustrated in, for example, FIG. 16. As illustrated in FIG. 19, a bubbling chamber 1337 formed by the walls 936 for ink flow path has $N_1$ (width of the bubbling chamber) of 33 µm and $N_2$ (length of the bubbling chamber) of 35 µm. The size of the heater 931 is 30 µm×30 µm, the resistance value of the heater is 53 Ω, and driving voltage is 10.3 V. A head in which the heights of the wall 936 for ink flow path and the partition wall 936a are 12 µm, and the thickness of the ejection-opening plate is 11 µm may be used.

Figure 17:
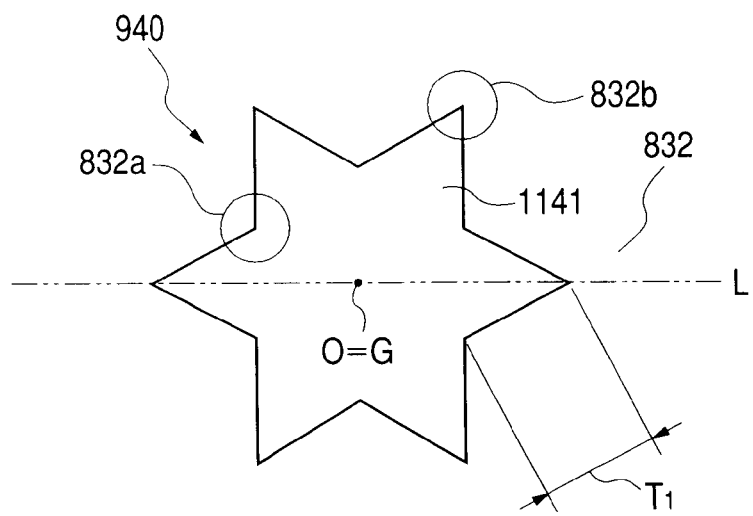
FIG. 17 is an enlarged view illustrating a part of the ejection openings shown in FIG. 16.

In the section of an ejection opening part 940 provided in the ejection-opening plate including ejection openings 832, the form of a section taken along a direction intersecting the ejecting direction (thickness-wise direction of the orifice plate 935) of the ink is a substantially star form as illustrated in FIG. 17 and is generally formed by 6 projected portions 832a having a corner of an obtuse angle and 6 recessed portions 832b alternately arranged between these projected portions 832a and having a corner of an acute angle. More specifically, 6 grooves (with respect to the position of the groove portion, see 1141a in FIG. 20) are formed in the thickness-wise direction (ejecting direction of the liquid) of the orifice plate shown in FIG. 15 by using the recessed portion 832b locally distant from the center O of the ejection opening as a top thereof and the projected portion 832a adjacent to this region and locally near from the center O of the ejection opening as a base.

In the liquid-ejecting head illustrated, the ejection opening part 940 is such that, for example, a section taken along a direction intersecting the thickness-wise direction thereof is in a form with 2 equilateral triangle having a side of 27 µm combined with each other in a state that one of them has been turned by 60 degrees. $T_1$ shown in FIG. 17 is 8 µm. The angles of the projected portions 832a are all 120 degrees, while the angles of the recessed portions 832b are all 60 degrees.

Accordingly, the center O of the ejection opening consists with the center of gravity G of a polygon formed by connecting centers (center (center of gravity) of a figure formed by connecting the top of the groove and 2 bases adjacent to the top) of the grooves adjacent to each other (see FIG. 17). The opening area of the ejection opening 832 in this embodiment is 400 µm$^2$, and the opening area (area of the figure formed by connecting the top of the groove and 2 bases adjacent to the top) of the groove is about 33 µm$^2$ per groove.

Figure 18:
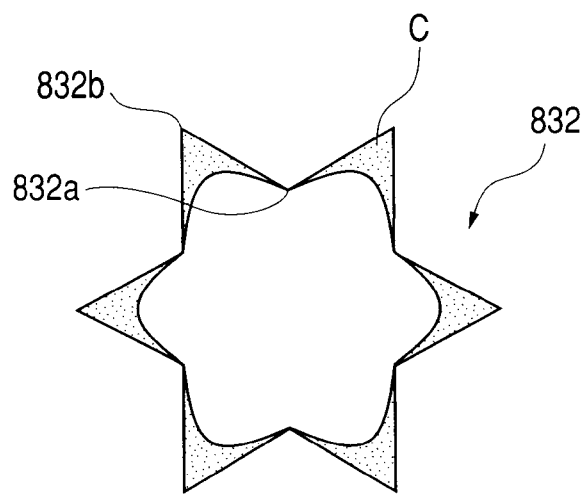
FIG. 18 typically illustrates a state that an ink has attached to the ejection opening portion shown in FIG. 17.

FIG. 18 is a typical drawing illustrating a state that an ink has attached to the ejection opening portion shown in FIG. 17. In FIG. 18, reference character C indicates a part to which the ink has been attached.

An ejecting operation of a liquid by the ink-jet recording head of the above-described construction will hereinafter be described with reference to FIGS. 20 to 27.

FIGS. 20 to 27 are cross-sectional views for illustrating the ejecting operation of a liquid by the liquid-ejecting head shown in FIGS. 15 to 19 and are cross-sectional views of the bubbling chamber 1337 shown in FIG. 19 taken along line 20—20. In this section, an end of the ejection opening part 940 in the thickness-wise direction of the orifice plate is the top 1141a of a groove 1141.

Figure 20:
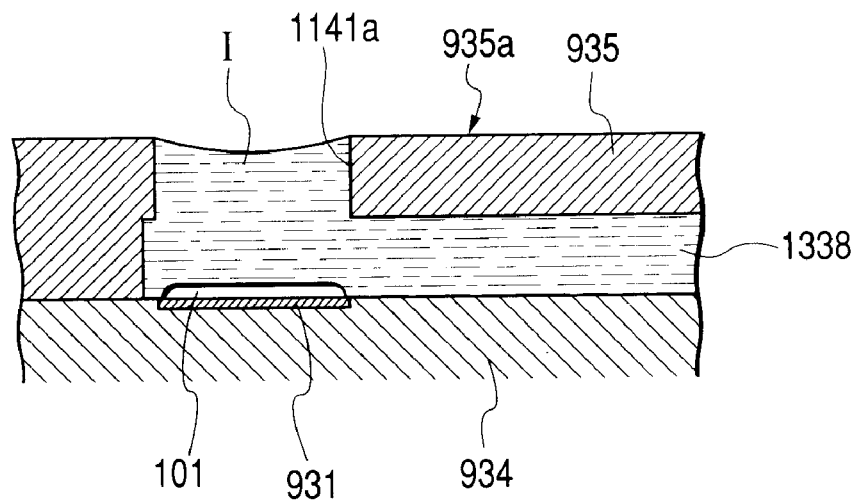
FIG. 20 is a schematic cross-sectional view corresponding to a sectional form taken along line 20—20 in FIG. 19 and illustrating an ejecting operation of a liquid in the liquid-ejecting head with time together with FIGS. 21 to 27.

FIG. 20 illustrates a state that a film-like bubble has been formed on the heater, and FIGS. 21, 22, 23, 24, 25, 26 and 27 illustrate states after about 1 µs from the state in FIG. 20, after about 2 µs from the state in FIG. 20, after about 3 µs from the state in FIG. 20, after about 4 µs from the state in FIG. 20, after about 5 µs from the state in FIG. 20, after about 6 µs from the state in FIG. 20 and after about 7 µs from the state in FIG. 20, respectively. Incidentally, in the following description, "drop" or "drop-in" does not mean drop in the so-called gravity direction, but means the movement in the direction of an electrothermal conversion element irrespective of the installing direction of a head.

Figure 21:
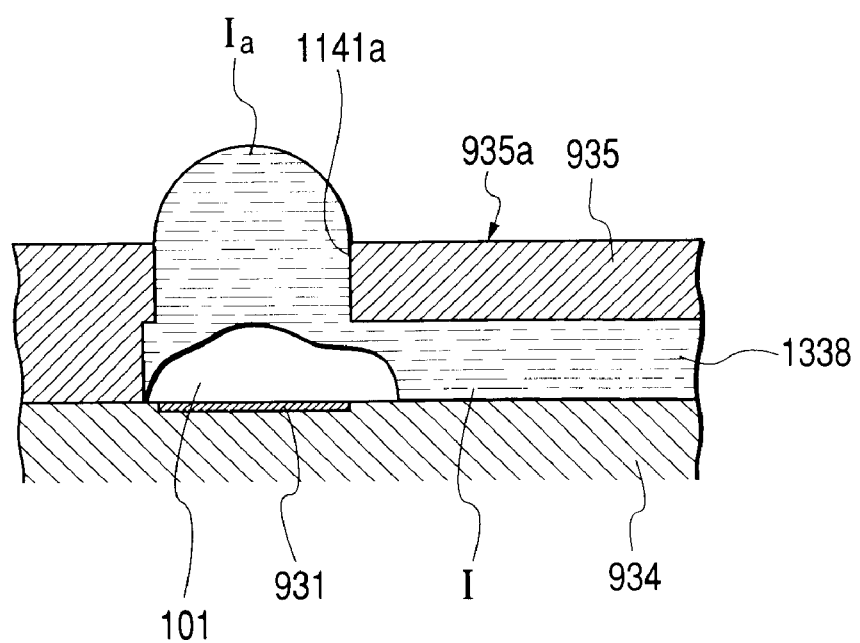
FIG. 21 is a schematic cross-sectional view corresponding to a sectional form taken along line 20—20 in FIG. 19 and illustrating an ejecting operation of the liquid in the liquid-ejecting head with time together with FIGS. 20 and 22 to 27.
Figure 22:
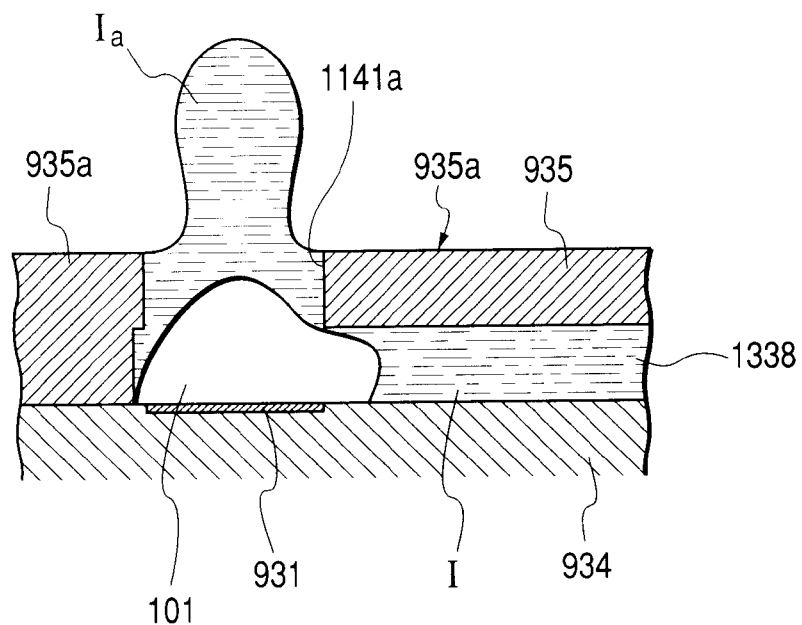
FIG. 22 is a schematic cross-sectional view corresponding to a sectional form taken along line 20—20 in FIG. 19 and illustrating an ejecting operation of the liquid in the liquid-ejecting head with time together with FIGS. 20, 21 and 23 to 27.

When a bubble 101 is first formed in a liquid flow path 1338 on a heater 931 by energizing the heater 931 on the basis of a recording signal or the like as illustrated in FIG. 20, the bubble quickly volumetrically expands and grows during about 2 µs as illustrated in FIGS. 21 and 22. The height of the bubble 101 in the greatest volume exceeds the face 935a of an ejection opening. At this time, the pressure of the bubble decreases from one to several to one to several tens as high as the atmospheric pressure.

Figure 23:
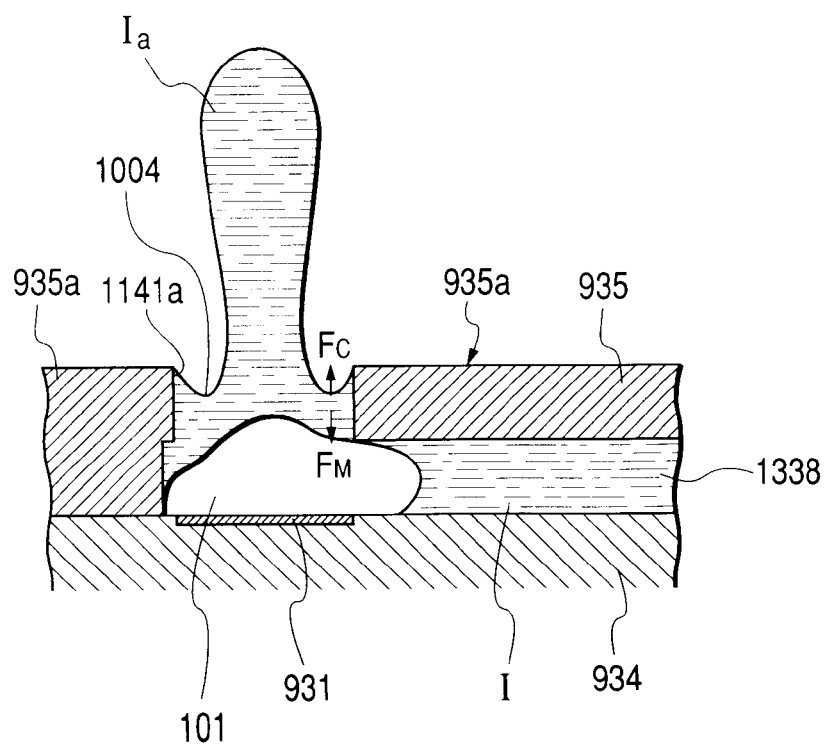
FIG. 23 is a schematic cross-sectional view corresponding to a sectional form taken along line 20—20 in FIG. 19 in the liquid-ejecting head and illustrating an ejecting operation of the liquid in the liquid-ejecting head with time together with FIGS. 20 to 22 and 24 to 27.

At the time about 2 µs have elapsed from the formation of the bubble, the volume of the bubble 101 turns from the greatest volume to decreased volume as described above, and at substantially the same time as this, the formation of a meniscus 1004 is started. The meniscus 1004 also recedes, i.e., drops in the direction of the heater 931 as illustrated in FIG. 23.

In this embodiment, the ejection opening part in the liquid-ejecting head illustrated has a plurality of grooves 1141 in a dispersed state, whereby capillary force acts in an opposite direction $F_C$ to the receding direction $F_M$ of the meniscus at the portion of the groove 1141 when the meniscus 1004 recedes. As a result, the forms of the meniscus and a main droplet (hereinafter may be referred to as "liquid" or "ink" in some cases) I when the meniscus recedes are compensated so as to give substantially symmetrical forms to the center of the ejection opening even if some variation is observed in the state of the bubble 101 by some cause.

Figure 24:
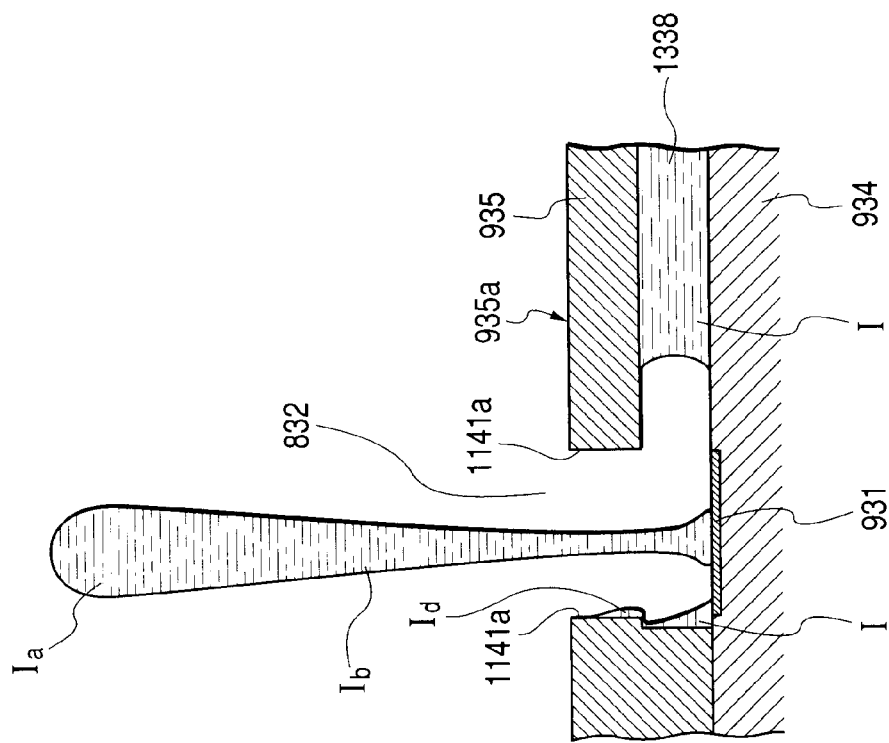
FIG. 24 is a schematic cross-sectional view corresponding to a sectional form taken along line 20—20 in FIG. 19 and illustrating an ejecting operation of the liquid in the liquid-ejecting head with time together with FIGS. 20 to 23 and 25 to 27.

In the liquid-ejecting head illustrated, the dropping velocity of this meniscus 1004 is faster than the contracting velocity of the bubble 101, so that the bubble 101 communicates with the atmosphere in the vicinity of the lower surface of the ejection opening 832 at the time about 4 µs have elapsed from the formation of the bubble as illustrated in FIG. 24. At this time, the liquid (ink) in the vicinity of the central axis of the ejection opening 832 drops toward the heater 931 because the liquid (ink) I pulled back on the side of the heater 931 by the negative pressure of the bubble 101 before the communication with the atmosphere retains the velocity in the direction toward the heater 931 by virtue of inertia even after the communication with the atmosphere.

Figure 25:
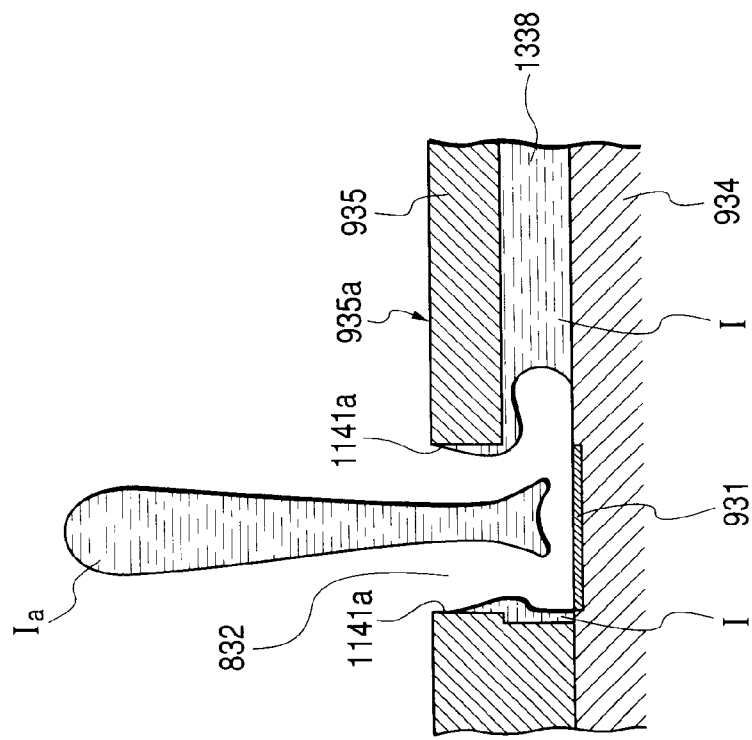
FIG. 25 is a schematic cross-sectional view corresponding to a sectional form taken along line 20—20 in FIG. 19 and illustrating an ejecting operation of the liquid in the liquid-ejecting head with time together with FIGS. 20 to 24, 26 and 27.
Figure 26:
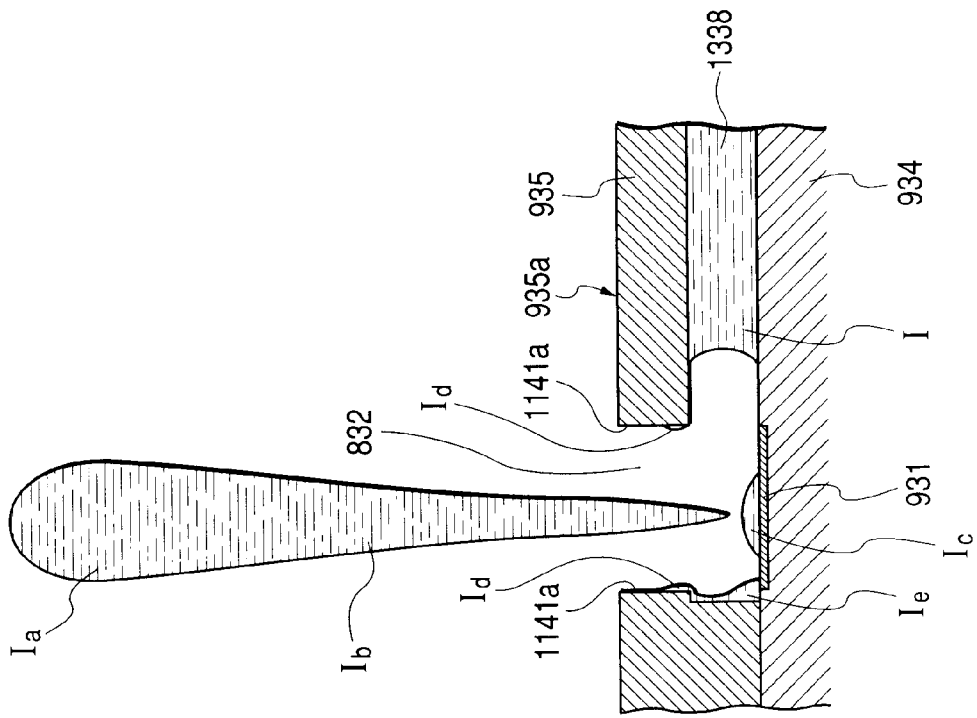
FIG. 26 is a schematic cross-sectional view corresponding to a sectional form taken along line 20—20 in FIG. 19 and illustrating an ejecting operation of the liquid in the liquid-ejecting head with time together with FIGS. 20 to 25 and 27.

The liquid (ink) dropped toward the side of the heater 931 reaches the surface of the heater 931 at the time about 5 µs have elapsed from the formation of the bubble as illustrated in FIG. 25, and spreads so as to cover the surface of the heater 931 as illustrated in FIG. 26. The liquid spread so as to cover the surface of the heater 931 as described above has a vector in a horizontal direction along the surface of the heater 931. However, a vector in a direction intersecting the surface of the heater 931, for example, vertical direction vanishes, so that the liquid intends to remain on the surface of the heater 931, thereby pulling a liquid located on the upper side than such a liquid, i.e., a liquid keeping a velocity vector in the ejecting direction, downward.

Figure 27:
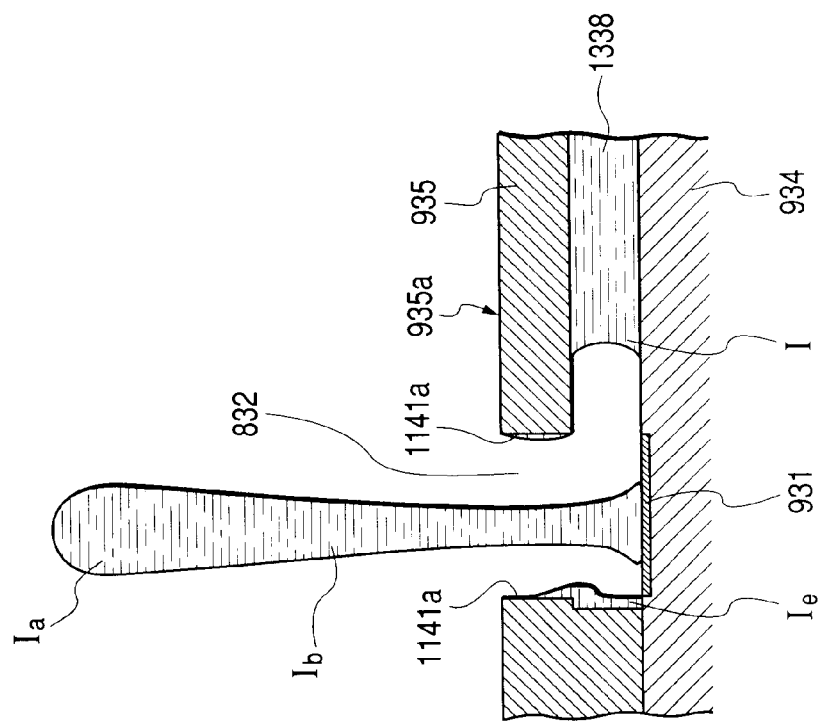
FIG. 27 is a schematic cross-sectional view corresponding to a sectional form taken along line 20—20 in FIG. 19 and illustrating an ejecting operation of the liquid in the liquid-ejecting head with time together with FIGS. 20 to 26.

Thereafter, a liquid portion $I_b$ between the liquid spread on the surface of the heater 931 and the liquid (main droplet) located on the upper side becomes thin, and is broken in the center of the surface of the heater 931 at the time about 7 µs have elapsed from the formation of the bubble as illustrated in FIG. 27, whereby the liquid is separated into a main droplet $I_a$ keeping a velocity vector in the ejecting direction and a liquid $I_C$ spread on the surface of the heater 931. The position of such separation is desirably the interior of the liquid flow path 1338, preferably a side closer to the electrothermal conversion element 931 than the ejection opening 832.

The main droplet $I_a$ is ejected from the central portion of the ejection opening 832 without deviation in the ejecting direction and ejection slippage and impacted at the prescribed position of a recording surface on a recording medium. The liquid $I_C$ spread on the surface of the heater 931 is ejected as a satellite droplet following the main droplet up to now. However, it remains on the surface of the heater 931 without being ejected.

Since the ejection of the satellite droplet can be prevented as described above, splash easy to occur by the ejection of the satellite droplet can be prevented, and staining of the recording surface on the recording medium with mist suspending in the form of fog can be surely prevented. In FIGS. 24 to 27, reference characters $I_d$ and $I_e$ indicate an ink (ink within the groove) attached to the groove portion and an ink remaining in the liquid flow path, respectively.

As described above, in the liquid-ejecting head illustrated, the direction of the main droplet upon ejection can be stabilized by the plural grooves dispersed to the center of the ejection opening when the liquid is ejected at the stage that the volume of the bubble decreases after growing into the greatest volume. As a result, a liquid-ejecting head free of slippage in the ejecting direction and high in impact accuracy can be provided. In addition, ejection can be stably conducted against the variation of bubbling at high driving frequency, whereby high-speed and high-definition printing can be realized.

In particular, in the liquid-ejecting head illustrated, the liquid is ejected by communicating the bubble with the atmosphere for the first time at the stage that the volume of the bubble decreases, whereby mist occurred upon the ejection of the droplet by communicating the bubble with the atmosphere can be prevented, so that the state that droplets attach to the ejection opening face, which forms the main cause of the so-called sudden ejection failure, can also be inhibited.

As another embodiment of the recording head of the ejection system that a bubble is communicated with the atmosphere upon ejection, may be mentioned the so-called edge shooter type as described in, for example, Japanese Patent Registration No. 2783647.

In particular, the present invention has excellent effects in recording heads and recording apparatus of an ink-jet system that thermal energy is utilized to form a droplet to be ejected, thereby conducting recording, among the ink-jet recording systems.

With respect to the typical construction and principle thereof, those using the basic principle disclosed in, for example, U.S. Pat. Nos. 4,723,129 and 4,740,796 are preferred.

This system may be applied to any of the so-called On-Demand type and continuous type. In particular, the On-Demand type is effective because at least one driving signal which corresponds to recording information and gives a rapid temperature rise exceeding film boiling is applied to an electrothermal converter arranged corresponding to a sheet or liquid path, in which a liquid (ink) is held, thereby causing the electrothermal converter to generate thermal energy to cause film boiling on the heat-acting surface of a recording head, so that a bubble can be formed in the liquid (ink) in response to the driving signal in relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent in responsiveness in particular can be achieved. It is therefore preferable to use such pulsed signals.

As the pulsed driving signal, such signals as described in U.S. Pat. Nos. 4,463,359 and 4,345,262 are suitable. When the conditions described in U.S. Pat. No. 4,313,124 that is an invention relating to the rate of temperature rise on the heat-acting surface are adopted, far excellent recording can be conducted.

As the construction of the recording head which makes up the ink cartridge, recording unit and ink-jet recording apparatus according to the present invention, such combined constructions (linear liquid flow path or perpendicular liquid flow path) of ejection openings, a liquid flow path and electrothermal converters as disclosed in the above-described U.S. specifications, and besides constructions based on U.S. Pat. Nos. 4,558,333 and 4,459,600 which disclose the construction that a heat-acting portion is arranged in a curved region may also be preferably used.

In addition, constructions based on Japanese Patent Application Laid-Open No. 59-123670 which discloses the construction that a slit common to a plurality of electrothermal converters are used as an ejection part of the electrothermal converters, and Japanese Patent Application Laid-Open No. 59-138461 which discloses the construction that an opening absorbing pressure wave of thermal energy is provided in opposition to an ejection part may also be effective for the present invention.

Further, as a full-line type recording head having a length corresponding to the longest width of recording media, on which a recording apparatus can record, both construction that the length is met by such a combination of plural recording heads as disclosed in the above-described specifications and construction as one recording head integrally formed may be used, and the above-described effects of the present invention can be more effectively exhibited.

In addition, the present invention is effective even when a replaceable, chip type recording head in which electrical connection to an apparatus body and the feed of an ink from the apparatus body become feasible by installing in the apparatus body, or a cartridge type recording head in which an ink tank is provided integrally in a recording head itself is used.

Further, the addition of recovery means for a recording head, preliminary auxiliary means, etc. which are provided as constitution of the recording apparatus according to the present invention is preferred because the effects of the present invention can be more stabilized. Specifically, capping means for the recording head, cleaning means, pressurizing or sucking means, preliminary heating means by electrothermal converters, other heating elements than these or combinations thereof, and preliminary ejection mode that ejection separate from recording is conducted may also be effective for stable recording.

As a recording mode of the recording apparatus, the present invention is extremely effective for not only recording mode using main colors such as black, but also apparatus equipped with at least one of complex color of different colors and full color by color mixing by integrally constructing a recording head or combining plural recording heads with each other.

In the above-described embodiments of the present invention, the inks have been described as liquid. However, inks solidified at room temperature or lower may also be used so far as they are softened or liquid at room temperature, or exhibit a liquid phase upon application of recording signals used because it is general in the above-described ink-jet systems that the temperature control of an ink itself is conducted within a range of from 30 to 70° C. to adjust the viscosity of the ink so as to fall within a stable ejection range.

In addition, inks that are liquefied by applying thermal energy according to recording signals and ejected as liquid inks, such as inks that temperature rise by thermal energy is positively prevented by using the thermal energy as energy for phase change from a solid phase to a liquid phase and inks solidified in a state left to stand for the purpose of preventing evaporation of the inks, and inks of a nature that they are liquefied for the first time by thermal energy, such as those already beginning to solidify at the time they reach a recording medium, may also be applied to the present invention. In such a case, the inks may be in a form that they are opposed to electrothermal converters in a state retained as a liquid or solid in recesses or through-holes in a porous sheet as described in Japanese Patent Application Laid-Open No. 54-56847 or 60-71260. In the present invention, the above-described film boiling system is most effective for the above-described inks.

Furthermore, as forms of the recording apparatus according to the present invention, forms that the apparatus is integrally or separately provided as an image output terminal for information processing instruments such as word processors and computers, and forms such as copying machines combined with a reader and facsimiles having a transmitting-receiving function may also be adopted.

The outline of a liquid-ejecting apparatus in which the above-described liquid-ejecting head is installed will hereinafter be described.

Figure 28:
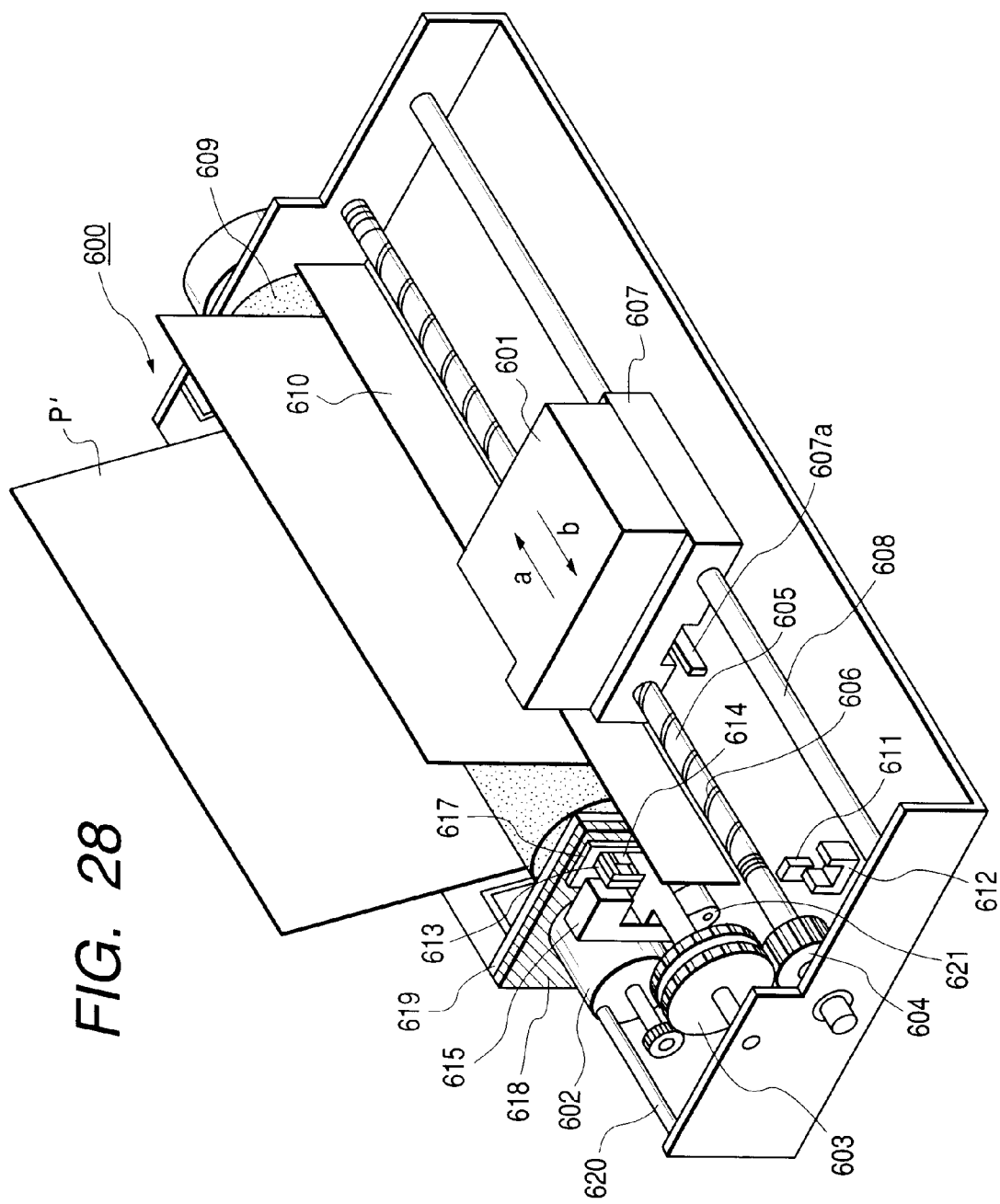
FIG. 28 is a schematic perspective view of an ink-jet recording apparatus which is an example of a liquid-ejecting apparatus to which the liquid-ejecting head according to the present invention can be installed and applied.

FIG. 28 is a schematic perspective view of an ink-jet recording apparatus 600 which is an example of a liquid-ejecting apparatus to which the liquid-ejecting head described above can be installed and applied.

In FIG. 28, an ink-jet head cartridge 601 is so constructed that the above-described liquid-ejecting head is integrally formed with an ink tank with an ink to be fed to the liquid-ejecting head held therein. The ink-jet head cartridge 601 is mounted on a carriage 607 engaged with a spiral groove 606 in a leadscrew 605 rotating through driving force-transmitting gears 603 and 604 interlocking with the forward and reverse rotations of a driving motor 602 and reciprocatingly moved in directions shown by arrows a, b along a guide 608 together with the carriage 607 by the power of the driving motor 602. A recording medium P' is conveyed on a platen roller 609 by a recording medium-conveying means (not illustrated) and pressed against the platen roller 609 over the moving direction of the carriage 607 by a paper presser plate 610.

Photocouplers 611 and 612 are arranged in the vicinity of an end of the leadscrew 605. These are home position-detecting means for confirming the presence of a lever 607a of the carriage 607 in this region to conduct change-over of the rotating direction of the driving motor 602, and the like.

A support member 613 serves to support a cap member 614 covering the front surface (ejection opening face) of the ink-jet head cartridge 601, in which ejection openings are present. An ink-sucking means 615 serves to suck an ink stored in the interior of the cap member 614 by empty ejection or the like from the ink-jet head cartridge 601. By this ink-sucking means 615, suction recovery of the ink-jet head cartridge 601 is conducted through an opening (not illustrated) in the cap. A cleaning blade 617 for wiping the ejection opening face of the ink-jet head cartridge 601 is provided movably in forward and backward directions (directions perpendicular to the moving directions of the carriage 607) by a moving member 618. These cleaning blade 617 and moving member 618 are supported by a body support 619. The cleaning blade 617 is not limited to this form, and any other well-known cleaning blade may be used.

Upon the suction recovery operation of the liquid-ejecting head, a lever 620 for initiating suction is moved with the movement of a cam 621 engaged with the carriage 607, and the driving power from the driving motor 602 is transfer-controlled by a publicly known means such as clutch shift. An ink-jet recording control part for applying a signal to a heater provided in the liquid-ejecting head of the ink-jet head cartridge 601 and conducting drive control of the above-described respective mechanisms is provided on the side of the apparatus body and not illustrated here.

The ink-jet recording apparatus 600 having the above-described construction conducts recording on the recording medium P' conveyed on the platen roller 609 by the recording medium-conveying means (not illustrated) while reciprocatingly moving the ink-jet head cartridge 601 over the full width of the recording medium P'.

Preferred modes of the inks according to the present invention described above, and preferred modes of the ink-jet recording process using these inks, the recorded articles formed by the process, the recording unit, the ink-jet cartridge and the ink-jet recording apparatus will hereinafter be shown collectively.

The inks according to the first embodiment of the present invention have a feature that they comprise the 2 organic compounds incompatible with each other, the compound exhibiting fluorescence properties and/or the coloring material exhibiting fluorescence properties, and the liquid medium dissolving or dispersing the 2 organic compounds incompatible with each other, the compound exhibiting fluorescence properties and/or the coloring material exhibiting fluorescence properties therein. They are preferably water-based inks. In addition, they are preferably inks suitable for use in ink-jet recording. Further, the content of the compound exhibiting fluorescence properties and/or the coloring material exhibiting fluorescence properties in the inks is preferably controlled to at most 1.5% by weight, more preferably at most 1.0% by weight. The compound exhibiting fluorescence properties and/or the coloring material exhibiting fluorescence properties used is preferably water-soluble or hydrophilic. They are preferably inks that the content of the fluorescent coloring material in the inks is such that the content of the compound exhibiting fluorescence properties and/or the coloring material exhibiting fluorescence properties in the inks is at least a concentration sufficient to exhibit the maximum fluorescence intensity in the inks, and particularly the content of the compound exhibiting fluorescence properties and/or the coloring material exhibiting fluorescence properties in the inks is at least a concentration sufficient to exhibit the maximum fluorescence intensity in the inks in a state dissolved in water.

As the 2 organic compounds incompatible with each other making up the inks according to the present invention, it is preferred that one of the 2 organic compounds incompatible with each other has a solubility parameter of at least 15, and the other has a solubility parameter of at most 13, that the 2 organic compounds incompatible with each other are both nonpolar compounds, that the 2 organic compounds incompatible with each other are both water-soluble, that the 2 organic compounds incompatible with each other are both liquid, that one of the 2 organic compounds incompatible with each other has a glycerol group, and that the organic compound having a glycerol group is a compound having at least 3 hydroxyl groups. The inks are preferably liquid at normal temperature. Further, it is preferable to use a nonionic surfactant as the other of the 2 organic compounds incompatible with each other. It is particularly preferred that the nonionic surfactant is liquid at normal temperature, or HLB of the nonionic surfactant is at most 13. It is also preferred that when the nonionic surfactant is contained in the inks, the nonionic surfactant is contained in the inks in an amount that the nonionic surfactant is not separated at an interface of an aqueous solution in a state of the aqueous solution, and that the nonionic surfactant is contained in the inks in an amount that the nonionic surfactant is not separated at an interface of the ink in a state of an ink from which the compound exhibiting fluorescence properties and/or the coloring material exhibiting fluorescence properties has been removed.

Preferred modes of the inks according to the present invention include an ink that the nonionic surfactant making up the ink has an acetylene group, and an ink that the nonionic surfactant has a structure represented by the following general formula (I)

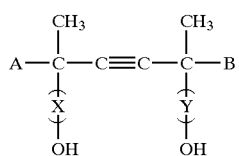

wherein A and B are, independently of each other, $C_nH_{2n+1}$ (n being an integer of 1 to 10), and X and Y are, independently of each other, a ring-opening ethylene oxide unit and/or a ring-opening propylene oxide unit.

Further preferred modes of the inks according to the present invention include an ink in which a monohydric alcohol is contained in addition to the above-described basic components, and an ink in which a coloring material exhibiting no fluorescence properties is additionally contained. The coloring material exhibiting no fluorescence properties used in this case is preferably a coloring material having a water-solubility. Further, the coloring material exhibiting no fluorescence properties is preferably a coloring material directly coloring a recording medium, more preferably an azo dye. As further preferred modes of the inks, may be mentioned an ink in which the content of the coloring material exhibiting no fluorescence properties in the inks is higher than the content of the fluorescent coloring material, an ink in which the coloring material exhibiting no fluorescence properties has a carboxyl group or its salt group, and an ink in which at least one ammonium ion is contained as a counter ion to the hydrophilic group of the coloring material exhibiting no fluorescence properties.

Further preferred modes of the inks according to the present invention include an ink in which at least one selected from urea and urea derivatives is contained in addition to the above-described essential components, an ink in which the urea derivative is not a cyclic compound, and an ink in which the urea derivative is at least one selected from alkyl derivatives of urea and ethylene oxide and/or propylene oxide adducts of urea.

Further preferred modes of the inks according to the present invention include an ink in which a compound having a solubility parameter value between the solubility parameter values of the 2 organic compounds incompatible with each other is used in combination in addition to the above-described essential components, and an ink which is nonionic in an ink system from which the compound exhibiting fluorescence properties and/or the coloring material exhibiting fluorescence properties, additives and the other coloring material have been removed.

The inks according to the present invention composed of such components as described above preferably have a surface tension of at most 40 mN/m (dyn/cm) and a pH of at least 8. Further, an ink in which an ammonium ion and an alkali metal ion are used in combination as counter ions of the coloring material(s) in the ink is preferred. Further, an ink in which the excitation maximum wavelength of the ink is smaller than the fluorescence maximum wavelength of the ink is preferred.

As an ink according to another embodiment of the present invention, a compound having a vapor pressure not lower than that of diethyleneglycol is additionally contained in addition to the above-described components, whereby the fluorescence at a colored portion can be retained over a long period of time. The mechanism thereof is as described above. When one of the 2 organic compounds is a compound having a glycerol group, and the other is a nonionic surfactant, examples of the compound having a vapor pressure not lower than that of diethyleneglycol include glycol compounds having a vapor pressure not lower than that of diethylene glycol. Examples of such glycol compounds include diethylene glycol and ethylene glycol.

The ink-jet recording process according to the present invention, in which an ink is ejected from an orifice in response to recording signals to conduct recording on a recording medium, thereby obtaining a recorded article features that the above-mentioned ink of a preferred mode according to the present invention is used as said ink. The ink-jet recording process according to the present invention is preferably of the type that thermal energy is applied to an ink to be ejected from the orifice to eject droplets of the ink. Preferred modes of the present invention include a recorded article obtained by the above-described ink-jet recording process, wherein the fluorescence intensity of a recorded portion formed on wood-free paper has a relatively proportional relationship to the water content in the wood-free paper, and a recorded article in which the excitation maximum wavelength is smaller than the fluorescence maximum wavelength.

Another preferred mode of the present invention includes a recording unit comprising an ink container containing the fluorescent ink for ink-jet according to the present invention and a head portion for ejecting the ink. Preferable examples of the recording unit according to the present invention include a recording unit in which the head portion has a construction that thermal energy is applied to the ink to eject ink droplets, a recording unit in which the ink container is formed of a polyolefin, a recording unit in which the ink container has an ink holding member therein, a recording unit in which the ink holding member is formed of at least one selected from the group consisting of polyurethane, cellulose, polyvinyl acetate and polyolefin, and a recording unit in which the ink holding member is composed of a polymer formed by a condensation or polymerization reaction of organic compound(s).

Further preferable examples of the recording unit according to the present invention include a recording unit in which the ink holding member is composed of a porous material, a recording unit in which the ink holding member has a multi-layer structure, a recording unit in which the direction of the multi-layer arrangement of the multi-layer structure is aligned in an ink discharging direction of the ink container, a recording unit in which the ink holding member is composed of fiber flocculate, a recording unit in which the fiber flocculate is oriented in an ink discharging direction of the ink container, and a recording unit in which the ink holding member has a contact surface with the ink container.

A further preferred mode of the present invention includes an ink cartridge comprising an ink container containing the fluorescent ink according to the present invention. Preferable examples thereof include an ink cartridge in which the ink container is formed of polyolefin, an ink cartridge in which the ink container has an ink holding member therein, an ink cartridge in which the ink holding member is formed of at least one selected from the group consisting of polyurethane, cellulose, polyvinyl acetate and polyolefin, and an ink cartridge in which the ink holding member is composed of a polymer formed by a condensation or polymerization reaction of organic compound(s).

Further preferable examples of the ink cartridge according to the present invention include an ink cartridge in which the ink holding member is composed of a porous material, an ink cartridge in which the ink holding member has a multi-layer structure, an ink cartridge in which the direction of the multi-layer arrangement of the multi-layer structure is aligned in an ink discharging direction of the ink container, an ink cartridge in which the ink holding member is composed of fiber flocculate, an ink cartridge in which the fiber flocculate is oriented in an ink discharging direction of the ink container, and an ink cartridge in which the ink holding member has a contact surface with the ink container.

A still further preferred mode of the present invention includes an ink-jet recording apparatus comprising an ink container containing the fluorescent ink for ink-jet according to the present invention and a head portion for ejecting the ink. Preferable examples thereof include an ink-jet recording apparatus equipped with the above-mentioned recording unit according to the present invention.

A yet still further preferred mode of the present invention includes an ink-jet recording apparatus equipped with the above-mentioned ink cartridge according to the present invention.

The present invention will hereinafter be described more specifically by the following Examples and Comparative Examples. Incidentally, all designations of "part" or "parts" and "%" as will be used in the following examples mean part or parts by weight and % by weight unless expressly noted. (Ink According to First Embodiment)

EXAMPLES 1 to 8 and

Comparative Examples 1 to 5

Their corresponding components shown in Tables 1-1 and 1-2 were mixed and thoroughly stirred into solutions or dispersions. The resultant solutions or dispersions were separately filtered under pressure through a Fluoropore Filter (trade name; product of Sumitomo Electric Industries, Ltd.) having a pore size of 0.1 μm, thereby preparing inks according to EXAMPLEs and COMPARATIVE EXAMPLEs.

| Name of dye | Structure | Color under daylight | Fluorescent color |
|---|---|---|---|
| Brilliant-sulfoflavin FF (C.I. 56205) | 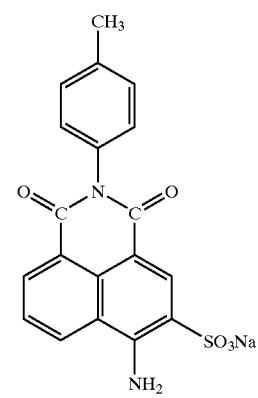 | Yellow | Green to yellowish green |

-continued

| Name of dye | Structure | Color under daylight | Fluorescent color |
|---|---|---|---|
| Basic Yellow HG (C.I. 46040) | | Yellow | Greenish yellow to yellow |
| Eosine (C.I. 45380) | | Red | Yellow to orange |
| Rhodamine 6G (C.I. 45160) | | Red | Yellow to orange |
| Rhodamine B (C.I. 45170) | | Pink | Orange to red |

| Name of pigment | Structure |
|---|---|
| Lumogen L Yellow | |

-continued

| Name of pigment | Structure |
|---|---|
| Lumogen L Brilliant Yellow | |
| Lumogen L Yellow Orange | |

-continued

Name of pigment  Structure

Lumogen L
Red Orange

[chemical structure]

<Evaluation>

The resultant inks according to EXAMPLES and COMPARATIVE EXAMPLES were used to evaluate the inks by means of an ink-jet printer BJF 800 (trade name, manufactured by Canon Inc.) in accordance with the following respective methods and standards. The results are shown in Table 2.

(Evaluation of Ejection Stability)

Each of the inks was charged in a prescribed amount into an ink tank of BJF 800 to record English characters and numerals on commercially available wood-free paper until the ink within the ink tank was used up. After the recording, recorded articles obtained at the first and the last of the recording were compared with each other to evaluate the ink as to the ejection stability in accordance with the following standard:

A: No difference was made between both recorded articles;
  B: Some disorder in quality was observed in the recorded article obtained at the last of the recording;
  C: Great disorder in quality was observed in the recorded article obtained at the last of the recording, and ejection failure was also marked.

(Evaluation of Stability)

Each of the resultant inks was placed in a laboratory glass dish and left to stand for 7 days under an environment of 60° C. Thereafter, the condition of the ink was visually observed to evaluate the ink as to the stability in accordance with the following standard:

A: Neither precipitate nor separation of ink components was observed;
  B: Separation was observed at an interface of the ink;
  C: Precipitate was observed to a great extent.

(Evaluation of Shelf Stability)

Each of the resultant inks was placed in a glass container, closed and left to stand for 1 month under an environment of 60° C. Thereafter, the ink was left to stand for additional 1 day under an environment of normal temperature and then visually observed to evaluate the ink as to the shelf stability in accordance with the following standard:

A: None of precipitate, suspended matter and separation of ink components were observed;
  B: Precipitate or suspended matter was slightly observed;
  C: Separation was observed at a gas-liquid interface of the ink;
  D: Precipitate was observed to a great extent.

(Evaluation of Coloring Ability)

English characters and numerals and a single-color image were recorded on commercially available wood-free paper to visually observe the resultant printed article, thereby evaluating each ink sample as to the coloring ability in accordance with the following standard:

A: Bright or clear:
  B: Not look dull though not bright;
  C: Look dull.

(Evaluation 1 of Fluorescence Properties)

A solid image was printed at 50% duty on commercially available wood-free paper under an environment of 23° C. and 50% RH to measure fluorescence intensity of the resulting print at a excitation wavelength of 260 mm and a emission wavelength of 600 mm by means of a fluorescence intensity meter, FP-750 (manufactured by Nippon Keiko K.K.) under conditions that the fluorescence intensity of the coloring materials used in EXAMPLES AND COMPARATIVE EXAMPLES is easiest to measure, thereby evaluating the inks as to the fluorescence properties in accordance with the following standard:

A: Fluorescence intensity$\geq$350;
  B: 350>Fluorescence intensity$\geq$300;
  C: 200>Fluorescence intensity.

(Evaluation 2 of Fluorescence Properties)

The same measurement as in Evaluation 1 of fluorescence properties was conducted under low-temperature and low-humidity environment of 15° C. and 10% RH to evaluate the inks in accordance with the same method and standard as described above. The results are shown in Table 2.

TABLE 2

Evaluation results of EXAMPLEs 1 to 8 and COMPARATIVE EXAMPLEs 1 to 5

|  | Example | | | | | | | | Comp. example | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Ejection stability | A | A | A | A | A | A | A | A | A | A | A | A | A |
| Stability | A | A | A | A | A | A | A | A | A | A | A | A | A |
| Shelf stability | A | A | A | A | A | A | A | A | B | B | B | B | B |
| Coloring ability | A | A | A | A | A | A | A | A | C | C | C | C | C |
| Fluorescence 1 | A | A | A | A | A | A | A | A | C | C | C | C | C |
| Fluorescence 2 | A | A | A | A | A | A | A | A | C | C | C | C | C |

(Ink According to Second Embodiment)

EXAMPLES 9 to 16 and

Comparative Examples 6 to 10

Inks according to respective EXAMPLEs and COMPARATIVE EXAMPLEs were prepared in the same manner as in EXAMPLE 1 except that their corresponding components shown in Tables 3 and 4 were used. The inks were evaluated in accordance with the same methods and standards as in EXAMPLE 1. With respect to the recorded articles according to EXAMPLEs 9 to 16 and COMPARATIVE EXAMPLEs 6 to 10, change in fluorescence properties with time was also observed in accordance with the following evaluation method and standard.

(Change in Fluorescence Properties with Time)

A solid image was printed at 50% duty on commercially available wood-free paper to measure fluorescence intensity of the resulting print by means of the fluorescence intensity meter, FP-750. The resultant solid printed sample was stuck on a wall in a room that was not directly exposed to sunlight and left to stand for 30 days in a state that a fluorescent lighting was turned on. Thereafter, the fluorescence intensity of the print was measured again. The resultant fluorescence intensity values were compared to evaluate the ink sample in accordance with the following standard:

A: Percent reduction of fluorescence intensity was not more than 5%;

B: Percent reduction of fluorescence intensity was not more than 10%;

C: Percent reduction of fluorescence intensity was more than 10%.

TABLE 1-1

Ink compositions of EXAMPLEs

| | | EXAMPLE | | | | | | | |
|---|---|---|---|---|---|---|---|---|---|
| | | 1 | 2 | 3 | 4 | 5 | 6 | 7 | 8 |
| Compound exhibiting fluorescence properties or coloring material exhibiting fluorescence properties | C.I. Acid Red 52 | 0.2 | 0.3 | 0.3 | 0.2 | 0.3 | 0.25 | 0.4 | 0.25 |
| | C.I. Acid Red 92 | | | | | 0.05 | | | |
| | C.I. Solvent Green 7 | | | | | 0.1 | | | |
| Coloring material exhibiting no fluorescence properties | Exemplified Coloring material (11) | | 0.4 | | | | 0.2 | | 0.5 |
| | Exemplified Coloring material (2) | | | | | 0.25 | | | |
| | C.I. Direct Yellow 86 | | | | | | | | |
| Compound having glycerol group | Glycerol | 10 | 10 | 8 | | | 10 | 10 | 8 |
| | Glycerol (dimer) | | | | 5 | | 5 | | |
| | Xylitol | | | | | 5 | | | |
| Glycol | Ethylene glycol | | | | | | | | |
| | Diethylene glycol | | | | | | | | |
| | Triethylene glycol | 10 | | 8 | 10 | 10 | | | 8 |
| | Tripropylene glycol | | | | 5 | | | | |
| Surfactant | Surfynol 440 | | | 0.1 | | | | | |
| | Surfynol 465 | 2 | 2 | 1.5 | | 1.0 | 2 | 0.7 | 1.5 |
| | Surfynol 485 | | | | | | | | |
| | Exemplified Compound (V) | | | | 1.0 | | | | |
| | Exemplified Compound (II) | | | | | | | 0.5 | |
| | Sodium laurate | | | | | | | | |
| Other component | Urea | | | 8 | | 5 | | | 8 |
| | Triethanolamine | | | | | 3 | | | |
| | Isopropylalcohol | | | 4 | 4 | 3 | | | 4 |
| | Purified water | | | | | Balance | | | |

TABLE 1-2

Ink compositions of COMPARATIVE EXAMPLEs

| | | COMPARATIVE EXAMPLE | | | | |
|---|---|---|---|---|---|---|
| | | 1 | 2 | 3 | 4 | 5 |
| Compound exhibiting fluorescence properties or coloring material exhibiting fluorescence properties | C.I. Acid Red 52 | 0.3 | 0.3 | 0.3 | 2.0 | 0.4 |
| | C.I. Acid Red 92 | | | | | |
| | C.I. Solvent Green 7 | | | | | |
| Coloring material exhibiting no fluorescence properties | Exemplified Coloring material (11) | | | | | |
| | Exemplified Coloring material (2) | | | | | |
| | C.I. Direct Yellow 86 | | | | | |
| Compound having glycerol group | Glycerol | | | | 10 | 10 |
| | Glycerol (dimer) | | | | | |
| | Xylitol | | | | | |
| Glycol | Ethylene glycol | 10 | | | | |
| | Diethylene glycol | | 10 | | | 10 |
| | Triethylene glycol | 10 | | | 10 | |
| | Tripropylene glycol | | | | | |
| Surfactant | Surfynol 440 | | | | | |
| | Surfynol 465 | | | 2 | | 2 |
| | Surfynol 485 | | | | | |
| | Exemplified Compound (V) | | | | | |
| | Exemplified Compound (II) | | | | | |
| | Sodium laurate | | | 1 | | |
| Other component | Urea | | | | | |
| | Triethanolamine | | | | 2 | |
| | Isopropylalcohol | 2 | | 4 | | 4 |
| | Purified water | | | Balance | | |

TABLE 3

Ink compositions of EXAMPLEs

| | | EXAMPLE | | | | | | | |
|---|---|---|---|---|---|---|---|---|---|
| | | 9 | 10 | 11 | 12 | 13 | 14 | 15 | 16 |
| Compound exhibiting fluorescence properties or coloring material exhibiting fluorescence properties | C.I. Acid Red 52 | 0.2 | 0.3 | 0.3 | 0.2 | 0.3 | 0.25 | 0.4 | 0.25 |
| | C.I. Acid Red 92 | | | | | 0.05 | | | |
| | C.I. Solvent Green 7 | | | | | 0.1 | | | |
| Coloring material exhibiting no fluorescence properties | Exemplified Coloring material (11) | | 0.4 | | | | 0.2 | | 0.5 |
| | Exemplified Coloring material (2) | | | | 0.25 | | | | |
| | C.I. Direct Yellow 86 | | | | | | | | |
| Compound having glycerol group | Glycerol | 10 | 10 | 8 | | | 10 | 10 | 8 |
| | Glycerol (dimer) | | | | 5 | | 5 | | |
| | Xylitol | | | | | 5 | | | |
| Glycol | Ethylene glycol | | | | 10 | 10 | 8 | | 8 |
| | Diethylene glycol | 10 | 10 | | | | 10 | 7 | |
| | Triethylene glycol | 10 | | 8 | 10 | 10 | | | 8 |
| | Tripropylene glycol | | | | | 5 | | | |
| Surfactant | Surfynol 440 | | | 0.1 | | | | | |
| | Surfynol 465 | 2 | 2 | 1.5 | | 1.0 | 2 | 0.7 | 1.5 |
| | Surfynol 485 | | | | | | | | |
| | Exemplified Compound (V) | | | | 1.0 | | | | |
| | Exemplified Compound (II) | | | | | | | 0.5 | |
| | Sodium laurate | | | 8 | | | | | |
| Other component | Urea | | | | 5 | | | | 8 |
| | Triethanolamine | | | | | 3 | | | |
| | Isopropylalcohol | | | 4 | 4 | 3 | | | 4 |
| | Purified water | | | | | Balance | | | |

TABLE 4

Ink compositions of COMPARATIVE EXAMPLEs

| | | COMPARATIVE EXAMPLE | | | | |
|---|---|---|---|---|---|---|
| | | 6 | 7 | 8 | 9 | 10 |
| Compound exhibiting fluorescence properties or coloring material exhibiting fluorescence properties | C.I. Acid Red 52 | 0.3 | 0.3 | 0.3 | 2.0 | 0.4 |
| | C.I. Acid Red 92 | | | | | |
| | C.I. Solvent Green 7 | | | | | |
| Coloring material exhibiting no fluorescence properties | Exemplified Coloring material (11) | | | | | |
| | Exemplified Coloring material (2) | | | | | |
| | C.I. Direct Yellow 86 | | | | | |
| Compound having glycerol group | Glycerol | | 10 | 10 | 10 | |
| | Glycerol (dimer) | | | | | |
| | Xylitol | | | | | |
| Glycol | Ethylene glycol | 10 | | | | |
| | Diethylene glycol | | | | | 10 |
| | Triethylene glycol | 10 | | | 10 | |
| | Tripropylene glycol | | | | | |
| Surfactant | Surfynol 440 | | | | | |
| | Surfynol 465 | | | 2 | | 2 |
| | Surfynol 485 | | | | | |
| | Exemplified Compound (V) | | | | | |
| | Exemplified Compound (II) | | | | | |
| | Sodium laurate | | 1 | | | |
| Other component | Urea | | | | | |
| | Triethanolamine | | | | 2 | |
| | Isopropylalcohol | 2 | 4 | 4 | | 4 |
| | Purified water | | | Balance | | |

TABLE 5

| | Example | | | | | | | | Comp. example | | | | |
|---|---|---|---|---|---|---|---|---|---|---|---|---|---|
| | 9 | 10 | 11 | 12 | 13 | 14 | 15 | 16 | 6 | 7 | 8 | 9 | 10 |
| Ejection stability | A | A | A | A | A | A | A | A | A | A | A | A | A |
| Stability | A | A | A | A | A | A | A | A | A | A | A | A | A |
| Shelf stability | A | A | A | A | A | A | A | A | A | A | A | A | A |
| Fluores- | A | A | A | A | A | A | A | A | C | A | C | C | C |

TABLE 5-continued

| | Example | | | | | | | | Comp. example | | | | |
|---|---|---|---|---|---|---|---|---|---|---|---|---|---|
| | 9 | 10 | 11 | 12 | 13 | 14 | 15 | 16 | 6 | 7 | 8 | 9 | 10 |
| cence 1 | | | | | | | | | | | | | |
| Fluorescence 2 | A | A | A | A | A | A | A | A | C | A | C | C | C |
| Change in fluorescence intensity with time | A | A | A | A | A | A | A | A | C | B | C | C | C |

As described above, according to the present invention, there can be provided an ink which can provide a recorded article to the recorded portion of which, for example, fluorescence properties important for colors of the natural kingdom are sufficiently imparted fully making good use of the fluorescence properties of the ink, and which the recorded article has high fluorescence intensity and is excellent in print quality including coloring ability, said ink being capable of enhancing the stability and reliability of the recorded article, an ink-jet recording process using such an ink, a recorded article obtained by the recording process, and instruments using such an ink. According to an embodiment of the present invention, there can also be provided a recorded article having a fluorescent colored portion the apparent fluorescence intensity of which is hard to be deteriorated with time.

What is claimed is:

1. An ink comprising:
   (i) first and second organic compounds which are incompatible with each other, and a compound having a solubility parameter value between the solubility parameter values of the two organic compounds incompatible with each other;
   (ii) a coloring material exhibiting fluorescence properties, wherein the coloring material includes two counter ions, one of which is an ammonium ion and the other of which is an alkali metal ion; and
   (iii) a liquid medium dissolving or dispersing the components (i) and (ii) therein.

2. The ink according to claim 1, which has a maximum wavelength for excitation and a fluorescence maximum wavelength, and the maximum wavelength for excitation is shorter than the fluorescence maximum wavelength.

3. The ink according to claim 1, which further comprises a compound having a vapor pressure not lower than that of diethylene glycol.

4. The ink according to claim 3, wherein the compound having a vapor pressure not lower than that of diethylene glycol has a solubility parameter between the solubility parameters of the first and the second organic compounds incompatible with each other.

5. The ink according to claim 3 or 4, wherein the compound having a vapor pressure of not lower than that of diethylene glycol is at least one of diethylene glycol and ethylene glycol.

* * * * *